US012801144B2

(12) United States Patent
Kobayashi et al.

(10) Patent No.: US 12,801,144 B2
(45) Date of Patent: Nov. 17, 2026

(54) DRONE TRAJECTORY MODIFICATION DISPLAY SYSTEM

(71) Applicant: Sony Group Corporation, Tokyo (JP)

(72) Inventors: Dai Kobayashi, Tokyo (JP); Erio Akanuma, Tokyo (JP); Tatsuya Ishizuka, Tokyo (JP); Hidenari Koshimae, Tokyo (JP); Noriya Maeda, Tokyo (JP); Satoshi Ueki, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/995,856

(22) PCT Filed: Jul. 14, 2023

(86) PCT No.: PCT/JP2023/025993

§ 371 (c)(1),
(2) Date: Jan. 17, 2025

(87) PCT Pub. No.: WO2024/024535

PCT Pub. Date: Feb. 1, 2024

(65) Prior Publication Data

US 2025/0390094 A1 Dec. 25, 2025

(30) Foreign Application Priority Data

Jul. 29, 2022 (JP) ................................ 2022-121071

(51) Int. Cl.
*G05D 1/224* (2024.01)
*G01S 13/08* (2006.01)
(Continued)

(52) U.S. Cl.
CPC ............ *G05D 1/2244* (2024.01); *G01S 13/08* (2013.01); *G01S 13/933* (2020.01); *G01S 17/08* (2013.01);
(Continued)

(58) Field of Classification Search
CPC ..... G01S 17/933; G01S 17/08; G05D 1/2244; G05D 1/46
See application file for complete search history.

(56) References Cited

U.S. PATENT DOCUMENTS

2006/0235581 A1 10/2006 Petillon
2014/0028476 A1 * 1/2014 Kolbe ...................... G08G 5/74 340/971

(Continued)

FOREIGN PATENT DOCUMENTS

CN 105892472 A * 8/2016 ........... G05D 1/0808
CN 114326775 A 4/2022

(Continued)

OTHER PUBLICATIONS

Machine translation of CN 105892472 A; (Year: 2016).*

(Continued)

*Primary Examiner* — Kenneth M Dunne
(74) *Attorney, Agent, or Firm* — Xsensus LLP

(57) ABSTRACT

The present disclosure relates to an information processing method, an information processing device, and a mobile body control system that enable real-time notification to a user of a movement plan modified during the automatic movement of a mobile body. The mobile body control system outputs, in reference to modification information input during automatic movement of a mobile body based on a movement plan, a modified plan obtained by modifying the movement plan, and displays the modified plan during the automatic movement of the mobile body based on the modified plan.

19 Claims, 21 Drawing Sheets

(51) Int. Cl.

| | |
|---|---|
| ***G01S 13/933*** | (2020.01) |
| ***G01S 17/08*** | (2006.01) |
| ***G01S 17/933*** | (2020.01) |
| ***G05D 1/223*** | (2024.01) |
| ***G05D 1/46*** | (2024.01) |

(52) U.S. Cl.

CPC .......... *G01S 17/933* (2013.01); *G05D 1/2232* (2024.01); *G05D 1/46* (2024.01)

(56) References Cited

U.S. PATENT DOCUMENTS

| | | | | |
|---|---|---|---|---|
| 2014/0316616 | A1* | 10/2014 | Kugelmass | G05D 1/0094 701/8 |
| 2016/0078770 | A1* | 3/2016 | Coulmeau | G06F 3/04847 701/3 |
| 2016/0139595 | A1* | 5/2016 | Yang | G05D 1/102 701/2 |
| 2017/0199053 | A1* | 7/2017 | Peng | G06F 17/40 |
| 2017/0221368 | A1 | 8/2017 | Zhang et al. | |
| 2017/0244937 | A1* | 8/2017 | Meier | H04N 23/66 |
| 2018/0024557 | A1* | 1/2018 | Leurent | A63H 27/12 701/2 |
| 2018/0253110 | A1* | 9/2018 | Tate | G05D 1/0607 |
| 2019/0056743 | A1* | 2/2019 | Alesiani | G05D 1/0217 |
| 2019/0094849 | A1* | 3/2019 | Kim | G05D 1/0044 |
| 2020/0019189 | A1* | 1/2020 | Chen | G08G 5/32 |
| 2020/0150673 | A1* | 5/2020 | Qiu | G01C 21/3614 |
| 2023/0162610 | A1* | 5/2023 | Beaudouin-Lafon | B64D 43/00 701/3 |
| 2023/0274649 | A1* | 8/2023 | Dewas | G08G 5/21 701/14 |
| 2024/0255943 | A1* | 8/2024 | Beaudouin-Lafon | B64C 39/024 |

FOREIGN PATENT DOCUMENTS

| | | | |
|---|---|---|---|
| JP | 2016-534467 | A | 11/2016 |
| JP | 2020-010965 | A | 1/2020 |
| WO | 2021/153175 | A1 | 8/2021 |

OTHER PUBLICATIONS

International Search Report and Written Opinion mailed on Aug. 22, 2023, received for International Application No. PCT/JP2023/025993, filed on Jul. 14, 2023, 9 pages including English Translation.

* cited by examiner

DRONE TRAJECTORY MODIFICATION DISPLAY SYSTEM

CROSS-REFERENCE TO RELATED APPLICATIONS

This application is a national stage application, pursuant to 35 U.S.C. § 371, of International Patent Application No. PCT/JP2023/025993, filed Jul. 14, 2023, which claims priority to Japanese Patent Application No. 2022-121071, filed Jul. 29, 2022, the entire contents of each are incorporated herein by reference.

TECHNICAL FIELD

The present disclosure relates to an information processing method, an information processing device, and a mobile body control system, and in particular, to an information processing method, an information processing device, and a mobile body control system that enable real-time notification to a user of a movement plan modified during the automatic movement of a mobile body.

BACKGROUND ART

Hitherto, there has been known a technology in which a flying device such as a drone automatically flies according to a flight plan set in advance.

PTL 1 discloses a flying device configured to, in a case where the flying device receives a flight route correction instruction from an operation device during a flight in the automatic flight mode, correct the flight route according to the correction instruction in question and control the flight according to a new flight route obtained through correction.

CITATION LIST

Patent Literature

[PTL 1]
Japanese Patent Laid-open No. 2020-10965

SUMMARY

Technical Problem

In a case where the movement route of a mobile body during automatic movement had been modified in reference to some kind of information, the user could not know the modified movement plan in real time.

The present disclosure has been made in view of such a circumstance and enables real-time notification to a user of a movement plan modified during the automatic movement of a mobile body.

Solution to Problem

An information processing method of the present disclosure is an information processing method including outputting, in reference to modification information input during automatic movement of a mobile body based on a movement plan, a modified plan obtained by modifying the movement plan, and displaying the modified plan during the automatic movement of the mobile body based on the modified plan.

An information processing device of the present disclosure is an information processing device including a plan modification unit configured to output, in reference to modification information input during automatic movement of a mobile body based on a movement plan, a modified plan obtained by modifying the movement plan, and a display control unit configured to display the modified plan during the automatic movement of the mobile body based on the modified plan.

A mobile body control system of the present disclosure is a mobile body control system including a mobile body, a plan modification unit configured to output, in reference to modification information input during automatic movement of the mobile body based on a movement plan, a modified plan obtained by modifying the movement plan, and a display control unit configured to display the modified plan during the automatic movement of the mobile body based on the modified plan.

In the present disclosure, in reference to modification information input during automatic movement of a mobile body based on a movement plan, a modified plan obtained by modifying the movement plan is output, and the modified plan is displayed during the automatic movement of the mobile body based on the modified plan.

DESCRIPTION OF EMBODIMENTS

Now, modes for carrying out the present disclosure (hereinafter referred to as embodiments) are described. Note that the descriptions are given in the following order.

1. Automatic Flight of Drone and Manual Operation Intervention
2. Overview of Mobile Body Control System According to Present Disclosure and Display Examples of Modified Plans
3. First Embodiment (Configuration for Achieving Visualization of Modified Plan)
4. Second Embodiment (Configuration for Achieving Flight Desired by User)
5. Configuration Example of Computer

1. Automatic Flight of Drone and Manual Operation Intervention

Hitherto, there has been known a technology in which a flying device such as a drone automatically flies according to a flight plan set in advance.

The flight plan includes a flight route and flight speed at which the drone is to fly. Specifically, the flight plan is set by a user specifying in advance position information (latitude and longitude), time, aircraft attitude (direction), the posture of a gimbal camera mounted on the drone, or the like on map data.

The flight plan set in such a manner is transferred to the drone, and when the user instructs the execution of automatic flight, the drone starts automatic flight. Note that "automatic flight" herein refers to a flight mode that enables flight without manual operation, which is called autopilot, semi-autonomous flight, fully autonomous flight, or the like.

Figure 1:
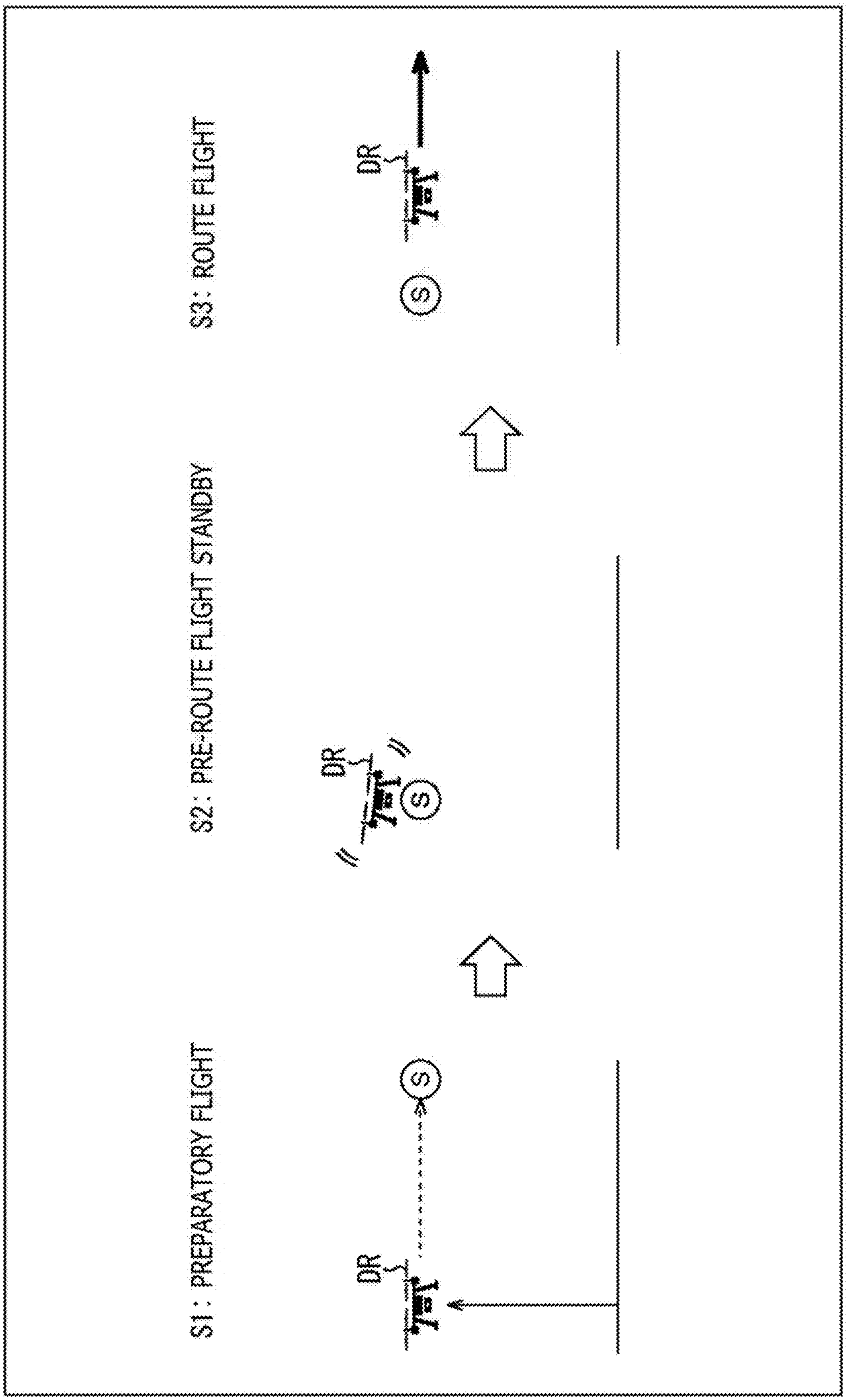
FIG. 1 is a diagram illustrating a flow of an automatic flight of a drone.

FIG. 1 is a diagram illustrating the flow of the automatic flight of a drone.

As illustrated in FIG. 1, in Step S1, a drone DR performs preparatory flight. Specifically, the drone DR rises from a takeoff point to a predetermined altitude and automatically flies linearly toward a start point(S).

In Step S2, the drone DR performs pre-route flight standby. Specifically, when arriving at the start point (S) by preparatory flight, the drone DR waits for a start instruction from the user at that start point(S). At this time, the drone DR may wait for the start instruction from the user while hovering.

Then, in Step S3, the drone DR performs route flight. That is, the drone DR automatically flies to follow a flight route included in a flight plan.

For this series of automatic flight of the drone DR executed as described above, the user can intervene by manual operation by operating an operation stick of a transmitter.

Figure 2:
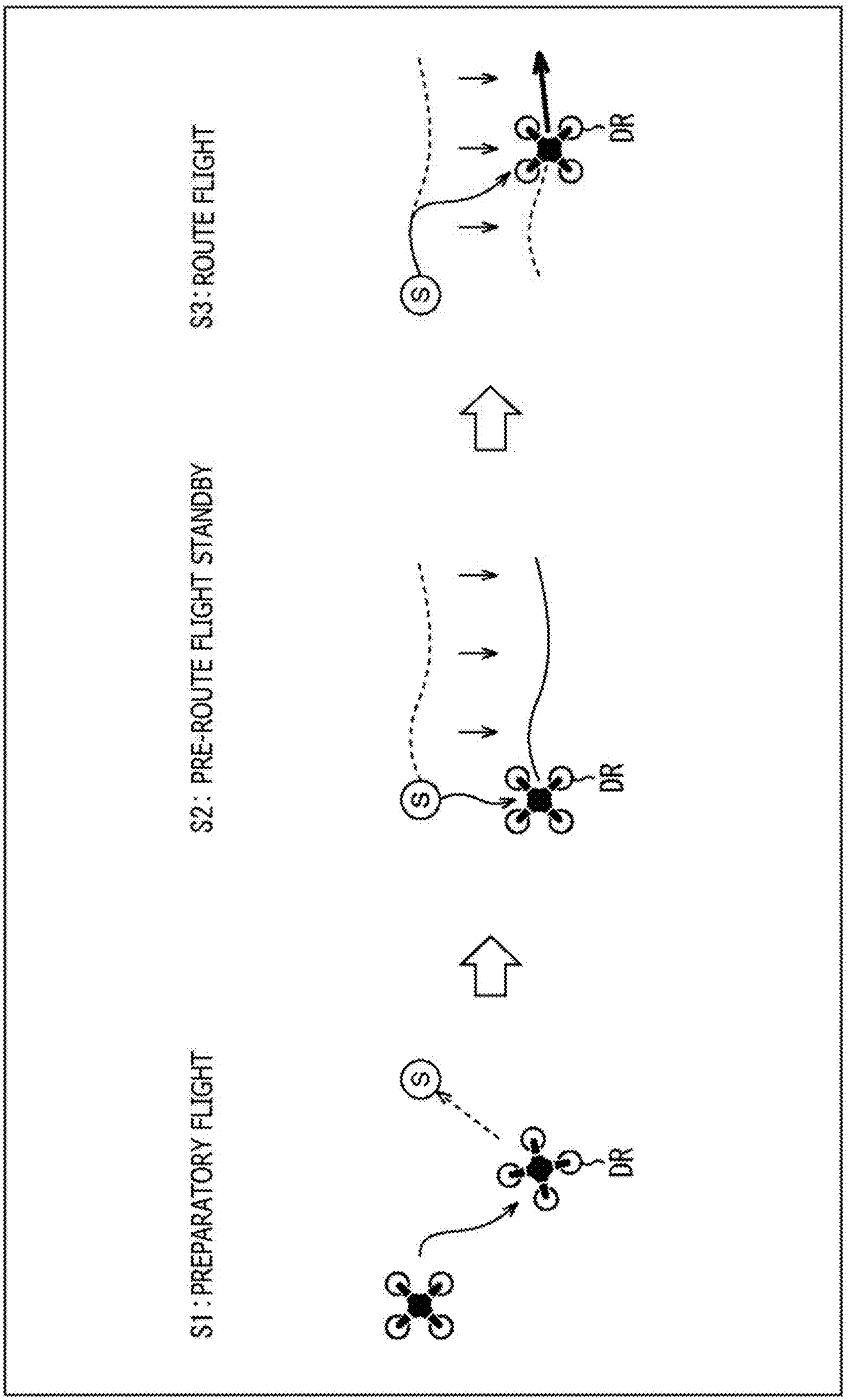
FIG. 2 is a diagram illustrating intervention by manual operation during the automatic flight.

FIG. 2 is a diagram illustrating intervention by manual operation during automatic flight.

Each step illustrated in FIG. 2 corresponds to the respective steps described with reference to FIG. 1.

That is, when the drone DR is performing preparatory flight in Step S1, if the user operates the operation stick of the transmitter, the drone DR flies in response to the user operations. However, when the user releases his/her hand from the operation stick and stops operating, the drone DR automatically flies linearly toward the start point(S) again.

Further, when the drone DR is performing pre-route flight standby in Step S2, if the user operates the operation stick of the transmitter, the entire flight route including the start point(S) is moved (shifted) in response to the user operations. Here, even if the user releases his/her hand from the operation stick and stops operating, the start point(S) and the flight route are not returned to their original positions.

Moreover, when the drone DR is performing route flight in Step S3, if the user operates the operation stick of the transmitter, for example, the entire flight route is moved (shifted) in response to the user operations, and the drone DR automatically flies to follow the moved flight route. Here as well, even if the user releases his/her hand from the operation stick and stops operating, the flight route is not returned to its original position.

Note that, in FIG. 2, the flight route of the drone DR is changed forward, backward, left, or right (in the horizontal direction with respect to the ground) by user operations, but the flight route may be changed up or down (in the vertical direction with respect to the ground).

The flight plan (flight route) of the drone DR as described with reference to FIG. 1 and FIG. 2 can be set using, for example, an application (app) for managing the operation and settings of the drone DR. Such an app is installed on a ground-based device operated by the user on the ground. The ground-based device can include a transmitter, a portable terminal, such as a tablet terminal or a smartphone, connected (attached) to that transmitter, a computer such as a PC (Personal Computer) forming the control system of the drone DR, or the like.

Figure 3:
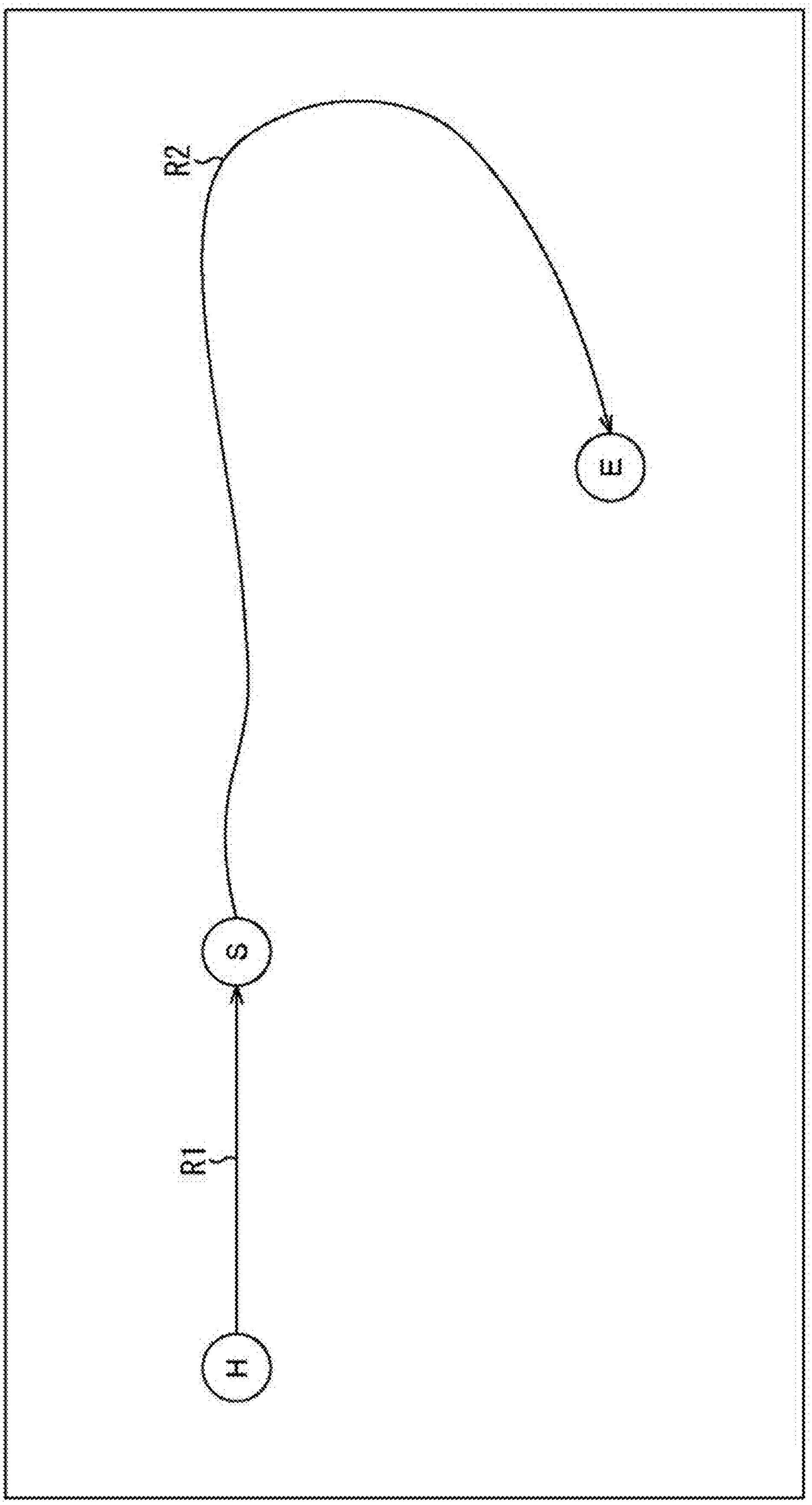
FIG. 3 is a diagram illustrating a display example of a flight plan on a ground-based device.

FIG. 3 is a diagram illustrating a display example of a flight plan on the ground-based device.

In the example of FIG. 3, as the flight plan of the drone DR, a flight route R1 that connects a takeoff point (H) to the start point(S) and a flight route R2 that connects the start point(S) to a goal point (E) are illustrated. Note that, in reality, the takeoff point (H), the start point(S), the goal point (E), and the flight routes R1 and R2 are displayed on map data, but in FIG. 3, the display of the map data is omitted.

The flight route R1 is a route for the drone DR to perform preparatory flight and connects the takeoff point (H) to the start point(S) in a straight line regardless of the intention of the user. Meanwhile, the flight route R2 is a route for the drone DR to perform route flight (automatic flight) and can be set by the user as desired. Note that, since the takeoff point (H) is determined by the position of the drone DR at the start of flight, in a strict sense, the flight route R1 from the takeoff point (H) to the start point(S) is not included in the flight plan. However, the present disclosure is not limited to this, and the start point(S) in the flight plan may be treated as identical to the takeoff point (H).

In such a manner, the flight plan set on the ground-based device is transferred to the drone DR, and when the user instructs the execution of automatic flight, the drone DR starts automatic flight following the flight routes R1 and R2.

However, as described above, even if the flight route is changed by the user operating the operation stick of the transmitter when the drone DR is performing route flight, the change could not be reflected in the flight plan displayed on the ground-based device. In such a manner, in a case where the flight route of the drone DR during automatic flight is modified, the user could not know the modified flight plan in real time.

Therefore, in the technology according to the present disclosure, in reference to modification information input during the automatic movement of a mobile body based on a movement plan, a modified plan obtained by modifying the movement plan is output, and the modified plan is displayed during the automatic movement of the mobile body based on the modified plan, so that real-time notification to the user of the movement plan modified during the automatic movement of the mobile body is achieved.

2. Overview of Mobile Body Control System According to Present Disclosure and Display Examples of Modified Plans (Hardware Configuration of Mobile Body Control System)

Figure 4:
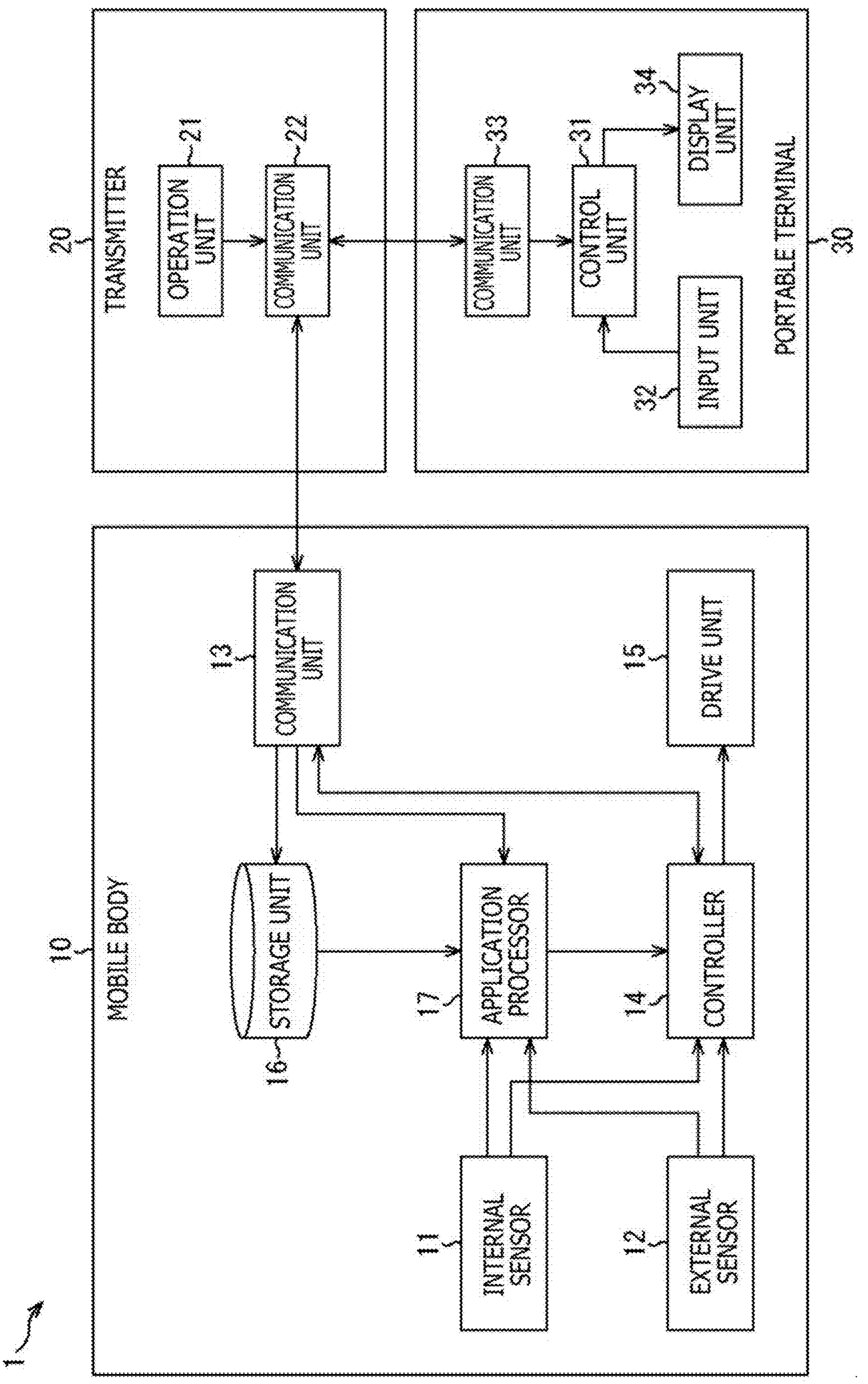
FIG. 4 is a block diagram illustrating a hardware configuration example of a mobile body control system.

FIG. 4 is a block diagram illustrating a hardware configuration example of a mobile body control system to which the technology according to the present disclosure is applied.

A mobile body control system 1 illustrated in FIG. 4 includes a mobile body 10, a transmitter 20, and a portable terminal 30.

In the mobile body control system 1, the mobile body 10 and the transmitter 20 are connected to be mutually communicable via a wireless communication path.

The mobile body 10 can include an autonomous mobile robot, such as a drone, an autonomous vehicle, a maritime autonomous surface ship, and an autonomous vacuum cleaner, or the like.

The mobile body 10 includes an internal sensor 11, an external sensor 12, a communication unit 13, a controller 14, a drive unit 15, a storage unit 16, and an application processor 17. This configuration is an example, and the mobile body 10 is not necessarily limited to this.

The internal sensor 11 is a sensor configured to detect the internal state of the mobile body 10. The internal sensor 11 includes, for example, an IMU (inertial measurement unit) capable of detecting the angle and angular velocity of the mobile body 10. Sensor information obtained by the internal sensor 11 is supplied to the controller 14 and the application processor 17.

The external sensor 12 is a sensor configured to detect the state of the external environment of the mobile body 10. The external sensor 12 includes, for example, a camera capable of capturing images of the surroundings of the mobile body 10, or a barometer capable of measuring atmospheric pressure. Sensor information obtained by the external sensor 12 is also supplied to the controller 14 and the application processor 17.

The communication unit 13 wirelessly communicates with the transmitter 20. Further, the communication unit 13 can also communicate with the portable terminal 30 connected to the transmitter 20 via the transmitter 20.

For example, the communication unit 13 receives operation information representing a user operation on the transmitter 20 and supplies the operation information to the controller 14 and the application processor 17, or receives a movement plan output from the portable terminal 30 via the transmitter 20 and supplies the movement plan to the storage unit 16.

The controller 14 includes, for example, an arithmetic device (processor) configured to control the movement of the mobile body 10. For example, the controller 14 controls the drive of the drive unit 15 in reference to the sensor information from the internal sensor 11 and the external sensor 12 and the operation information from the communication unit 13, and thereby achieves the manual movement of the mobile body 10. Moreover, the controller 14 controls the drive of the drive unit 15 in reference to control information from the application processor 17, and thereby achieves the automatic movement of the mobile body 10.

Further, the controller 14 supplies movement situation information representing the current movement situation of the mobile body 10 to the communication unit 13 at time intervals set in advance. The communication unit 13 transmits the movement situation information from the controller 14 to the transmitter 20.

The drive unit 15 is a mechanism for causing the mobile body 10 to move and includes a flight mechanism, a travel mechanism, a propulsion mechanism, or the like. In a case where the mobile body 10 is configured as a drone, the drive unit 15 includes motors, propellers, and the like as a flight mechanism. Further, in a case where the mobile body 10 is configured as an autonomous vehicle, the drive unit 15 includes motors, wheels, and the like as a travel mechanism. In a case where the mobile body 10 is configured as a maritime autonomous surface ship, the drive unit 15 includes screw propellers and the like as a propulsion mechanism.

The storage unit 16 stores the movement plan output from the portable terminal 30 and received by the communication unit 13. The movement plan includes the movement route of the mobile body 10 desired by the user. The movement route may be represented by a series of pieces of position information indicated by latitude and longitude, or by position information and altitude, speed, and time for each piece of position information. Moreover, the movement plan may include, for each piece of position information representing the movement route, the attitude (imaging direction) of a gimbal camera, which is not illustrated, mounted on the mobile body 10, the model direction and acceleration of the mobile body 10, and other information associated with the movement of the mobile body 10.

The application processor 17 reads out the movement plan stored in the storage unit 16, to generate control information for the mobile body 10 to automatically move, in reference to the read movement plan and the sensor information from the internal sensor 11 and the external sensor 12. With the control information being supplied to the controller 14, the automatic movement of the mobile body 10 that avoids collisions with obstacles and the like while following the movement plan is achieved.

Further, the application processor 17 modifies the movement plan read out from the storage unit 16 in reference to the operation information from the communication unit 13 and other modification information. Control information generated according to the modified plan obtained through modification is also output to the controller 14.

The transmitter 20 can include a remote controller operated by the user who operates and controls the mobile body 10.

The transmitter 20 includes an operation unit 21 and a communication unit 22. This configuration is an example, and the transmitter 20 is not necessarily limited to this.

The operation unit 21 includes operation sticks, switches, buttons, or the like, and supplies operation information representing user operations to the communication unit 22. For example, the operation unit 21 can include two operation sticks that achieve each of forward/backward and left/right turning operations and up/down and left/right movement operations of the mobile body 10 by up/down/left/right operations. Further, the operation unit 21 may include an input interface such as a touch panel capable of receiving up/down/left/right operations.

The communication unit 22 can transmit operation information representing user operations on the operation unit 21 to the mobile body 10 by wirelessly communicating with the mobile body 10.

Further, the communication unit 22 can transmit to the mobile body 10 a movement plan generated in the portable terminal 30 and supply to the portable terminal 30 movement situation information transmitted from the mobile body 10, by communicating with the portable terminal 30 connected to the transmitter 20.

The portable terminal 30 includes a tablet terminal, a smartphone, or the like connected (attached) to the transmitter 20.

The portable terminal 30 includes a control unit 31, an input unit 32, a communication unit 33, and a display unit 34. This configuration is an example, and the portable terminal 30 is not necessarily limited to this. For example, instead of being configured separately from the transmitter 20 described above, the portable terminal 30 may be configured integrally with the transmitter 20 such that a single terminal has the respective configurations of the transmitter 20 and the portable terminal 30.

The control unit 31 includes a processor such as a CPU (Central Processing Unit) and executes a predetermined program in response to an input signal or the like from the input unit 32, to control each unit of the portable terminal 30. For example, the control unit 31 launches an app for managing the operation and settings of the mobile body 10, according to the input signal from the input unit 32, and generates a movement plan for the mobile body 10.

The input unit 32 includes a touch panel, buttons, or the like, and supplies an input signal corresponding to a user operation to the control unit 31.

The communication unit 33 communicates with the transmitter 20 to which the portable terminal 30 is connected (attached), and indirectly sends and receives information to and from the mobile body 10. Further, the communication unit 33 may directly communicate wirelessly with the mobile body 10.

The display unit 34 includes a liquid crystal display, an organic EL display, or the like, and displays various types of information under the control of the control unit 31. For example, the display unit 34 displays the movement plan generated by the control unit 31 and movement situation information transmitted from the mobile body 10, according to the control of the control unit 31.

(Schematic Functional Configuration of Mobile Body Control System)

Figure 5:
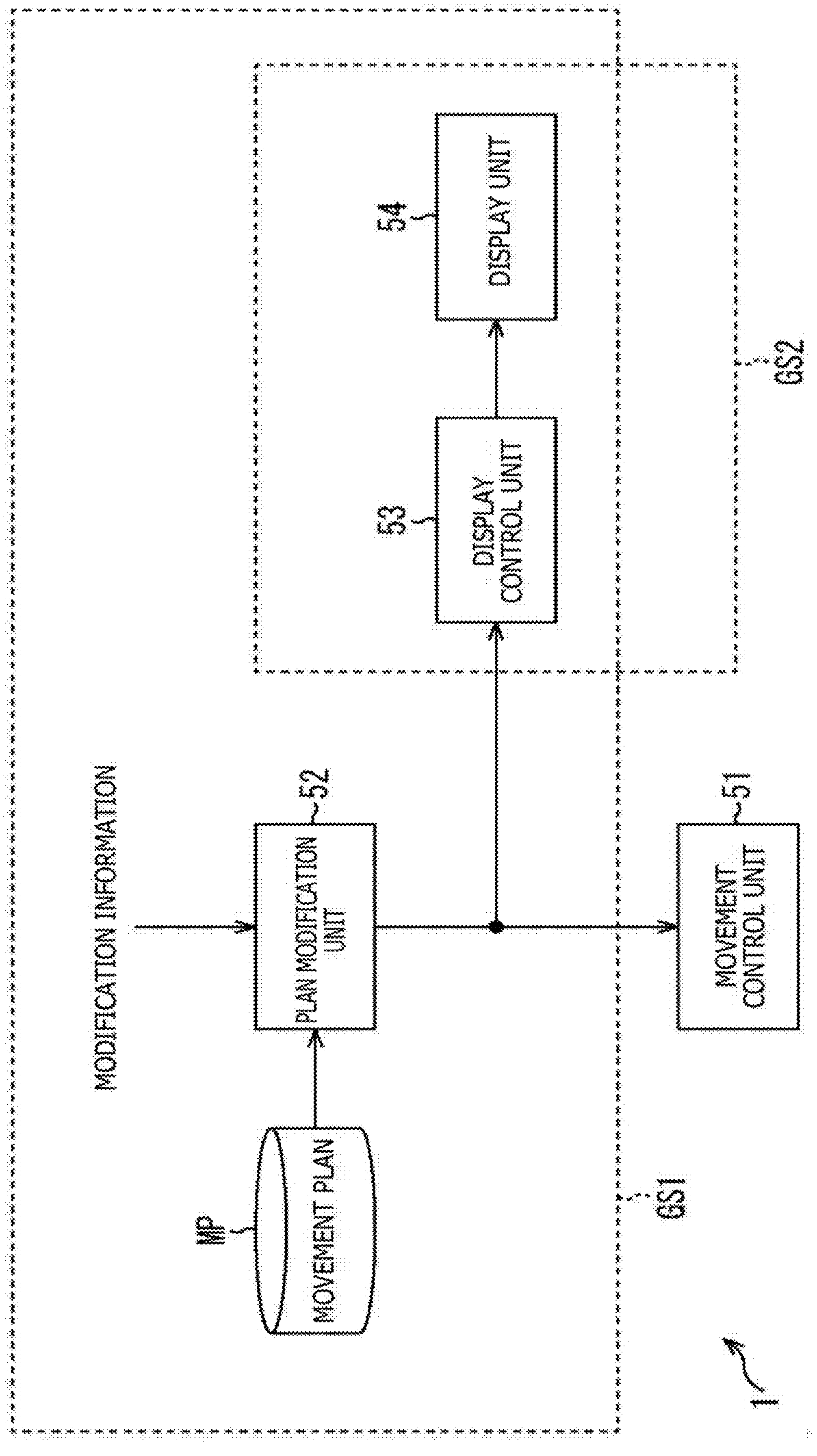
FIG. 5 is a block diagram illustrating a schematic functional configuration example of the mobile body control system.

FIG. 5 is a block diagram illustrating a schematic functional configuration example of the mobile body control system 1.

The mobile body control system 1 illustrated in FIG. 5 includes a movement control unit 51, a plan modification unit 52, a display control unit 53, and a display unit 54. The movement control unit 51 corresponds to the controller 14 of FIG. 4, and the plan modification unit 52 corresponds to the application processor 17 of FIG. 4. Further, the display control unit 53 corresponds to the control unit 31 of FIG. 4, and the display unit 54 corresponds to the display unit 34 of FIG. 4.

The movement control unit 51 controls the automatic movement of the mobile body 10 according to a movement plan MP output via the plan modification unit 52 and sensor information from the various sensors included in the mobile body 10.

The plan modification unit 52 outputs, in reference to modification information input during the automatic movement of the mobile body 10 based on the movement plan MP, a modified plan obtained by modifying the movement plan. The movement control unit 51 controls the automatic movement of the mobile body 10 according to the modified plan output by the plan modification unit 52.

Specifically, the plan modification unit 52 modifies the movement route of the mobile body 10 included in the movement plan, in reference to the modification information.

The modification information input during the automatic movement of the mobile body 10 includes, for example, surrounding information representing the situation around the mobile body 10 and operation information representing movement plan modification operations by the user. Specifically, the surrounding information is information based on the presence or absence of objects around the mobile body 10, due to which the modification of the movement route of the mobile body 10 in question would be required. The surrounding information includes, for example, distance information representing a certain distance to be maintained between the mobile body 10 and an approach avoidance target that the mobile body 10 in question is to avoid approaching. Further, the surrounding information can include, for example, area information representing the existence of entry prohibited areas (flight prohibited areas), weather information representing weather conditions such as temperature, humidity, wind, rain, and snow, or mobile body information representing the positions of other mobile bodies (other drones, other aircrafts, and the like) acquired through communication or from sensor information. Further, the movement plan modification operations by the user may be performed on the movement route of the mobile body 10 included in the movement plan displayed on the display unit 54.

For example, the plan modification unit 52 modifies position information representing the movement route of the mobile body 10 as a whole, in reference to the modification information.

In a case where an operation input in the forward-backward or left-right direction is made to the operation stick (operation unit 21) of the transmitter 20 during the automatic movement of the mobile body 10, the change distance [m] in the horizontal direction of the mobile body 10 is input as modification information. Further, in a case where an operation input in the up-down direction is made to the operation stick (operation unit 21) of the transmitter 20 during the automatic movement of the mobile body 10, the change distance [m] in the altitude direction of the mobile body 10 is input as modification information.

The plan modification unit 52 moves (shifts) the position information regarding the current and subsequent positions included in the movement plan by a change distance represented by the modification information, and thereby modifies the movement route of the mobile body 10 as a whole. At this time, the goal point in the movement plan may not be modified, and the movement route may be modified to eventually reach the goal point. Further, the goal point in the movement plan may be moved (shifted) together with the position information representing the movement route of the mobile body 10 such that the movement route including the goal point is modified as a whole.

Here, the movement control unit 51 controls the movement speed of the mobile body 10 according to at least the relation between the current movement position of the mobile body 10 and the movement position newly determined through modification.

Further, for example, the plan modification unit 52 sequentially modifies the position information representing the movement route of the mobile body 10, in reference to the modification information.

In a case where an operation input in the forward-backward or left-right direction is made to the operation stick (operation unit 21) of the transmitter 20 during the automatic movement of the mobile body 10, the change distance displacement amount [m] in the horizontal direction of the mobile body 10 is sequentially input as modification information. Further, in a case where an operation input in the up-down direction is made to the operation stick (operation unit 21) of the transmitter 20 during the automatic movement of the mobile body 10, the change distance displacement amount [m] in the altitude direction of the mobile body 10 is sequentially input as modification information.

The plan modification unit 52 repeatedly moves, each time the modification information is input, the current position information included in the movement plan by a change distance displacement amount represented by the modification information, thereby sequentially modifying the movement route of the mobile body 10.

Here, the movement control unit 51 controls the movement speed of the mobile body 10 according to at least the relation between the current movement position of the mobile body 10 and the movement position newly determined through modification.

The display control unit 53 controls the display unit 54 to display, during the automatic movement of the mobile body 10 based on the modified plan output by the plan modification unit 52, the modified plan in question. Specifically, the display control unit 53 (display unit 54) displays, as a modified plan, the movement route of the mobile body 10 which is included in the movement plan and which has been modified by the plan modification unit 52 in reference to the modification information.

For example, in a case where the position information representing the movement route of the mobile body 10 has been modified as a whole by the plan modification unit 52, the display control unit 53 (display unit 54) displays a movement route represented by the position information modified as a whole. Further, in a case where the position information representing the movement route of the mobile body 10 has been sequentially modified by the plan modification unit 52, the display control unit 53 (display unit 54) sequentially displays a movement route represented by the sequentially modified position information.

Each functional block forming the mobile body control system 1 of FIG. 5 described above may be achieved by either the mobile body 10 or the ground-based device including the transmitter 20 and the portable terminal 30, which form the mobile body control system 1 of FIG. 4.

For example, as indicated by the dotted line in FIG. 5, the plan modification unit 52, the display control unit 53, and the display unit 54 may be achieved by a ground-based device GS1. In this case, only the movement control unit 51 is achieved by the mobile body 10.

Further, as indicated by the dotted line in FIG. 5, the display control unit 53 and the display unit 54 may be achieved by a ground-based device GS2. In this case, the movement control unit 51 and the plan modification unit 52 are achieved by the mobile body 10.

(Flow of Processing of Mobile Body Control System)

Figure 6:
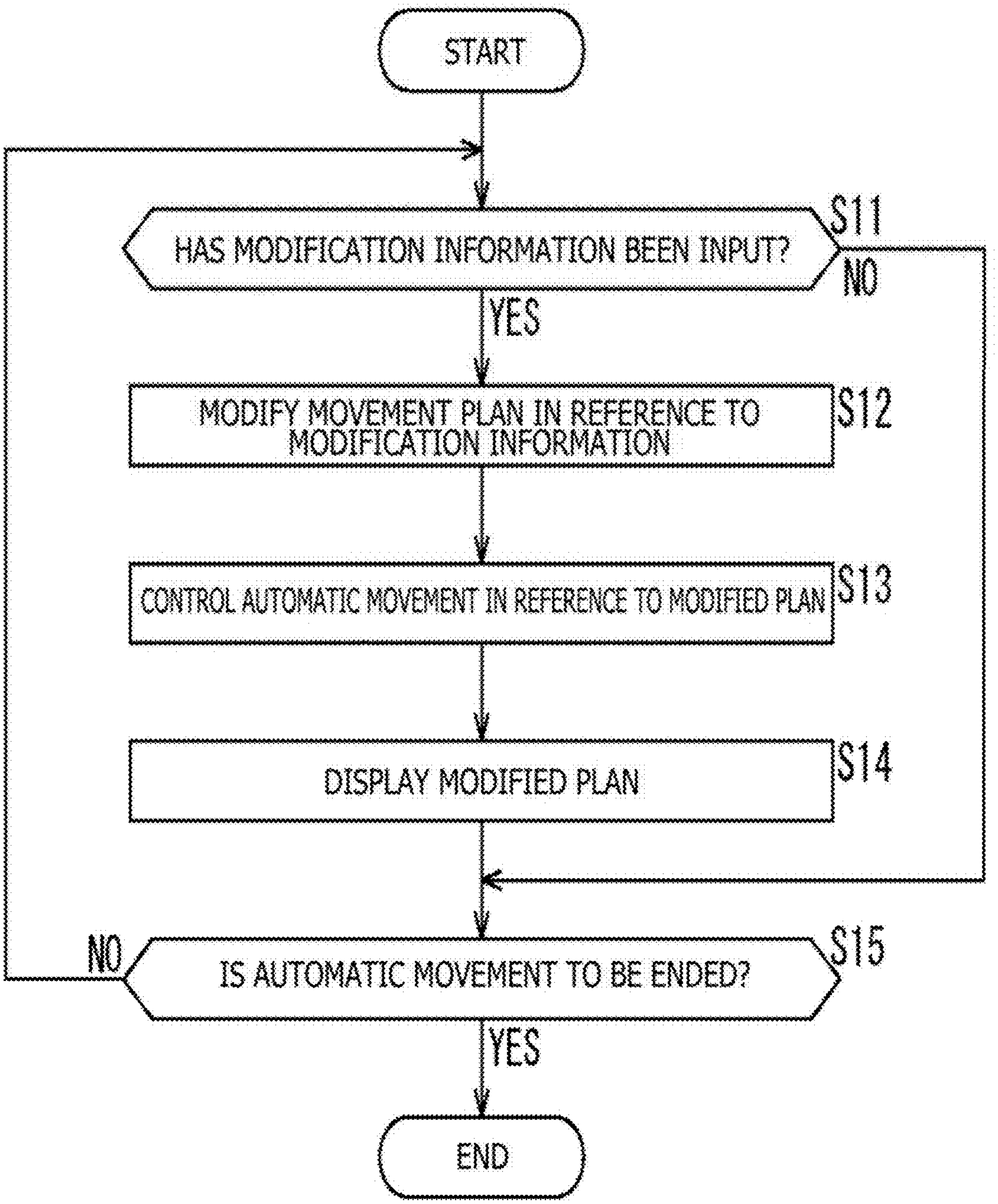
FIG. 6 is a flowchart illustrating the flow of processing of the mobile body control system.

With reference to the flowchart of FIG. 6, the flow of the processing of the mobile body control system 1 of FIG. 5 is described. The processing of FIG. 6 is executed during the automatic movement of the mobile body 10 based on a movement plan.

In Step S1, the plan modification unit 52 determines whether modification information has been input or not.

In a case where it is determined in Step S1 that modification information has been input, the processing proceeds to Step S2, and the plan modification unit 52 modifies the movement plan in reference to the input modification information. Specifically, the plan modification unit 52 modifies the movement route of the mobile body 10 included in the movement plan, in reference to the modification information. The modified movement plan (modified plan) is output to the movement control unit 51 and the display control unit 53.

In Step S3, the movement control unit 51 controls the automatic movement of the mobile body 10, in reference to the modified plan output by the plan modification unit 52.

In Step S4, the display control unit 53 controls the display unit 54 to display the modified plan output by the plan modification unit 52. Specifically, the display control unit 53 displays the modified movement route as a modified plan.

Here, the control of the automatic movement of the mobile body 10 in Step S3 and the display of the modified plan in Step S4 may be performed in parallel.

Note that, in a case where it is determined in Step S1 that modification information has not been input, Step S2 to Step S4 are skipped.

In Step S5, the movement control unit 51 determines whether to end the automatic movement based on the movement plan (modified plan) or not.

In a case where it is determined in Step S5 not to end the automatic movement, the processing returns to Step S1, and the subsequent processing is repeated.

On the other hand, in a case where it is determined in Step S5 to end the automatic movement, the movement control unit 51 ends the automatic movement of the mobile body 10, and the processing ends.

With the processing described above, it becomes possible to achieve real-time notification to the user of a movement plan modified during the automatic movement of the mobile body, and to allow the user to easily know the modified movement plan.

(Display Examples of Modified Plans)

Here, display examples of modified plans displayed on the display unit 54 are described. In the following, an example of a case where the flight plan described with reference to FIG. 3 for the mobile body 10, which serves as a drone, has been modified is given.

Figure 7:
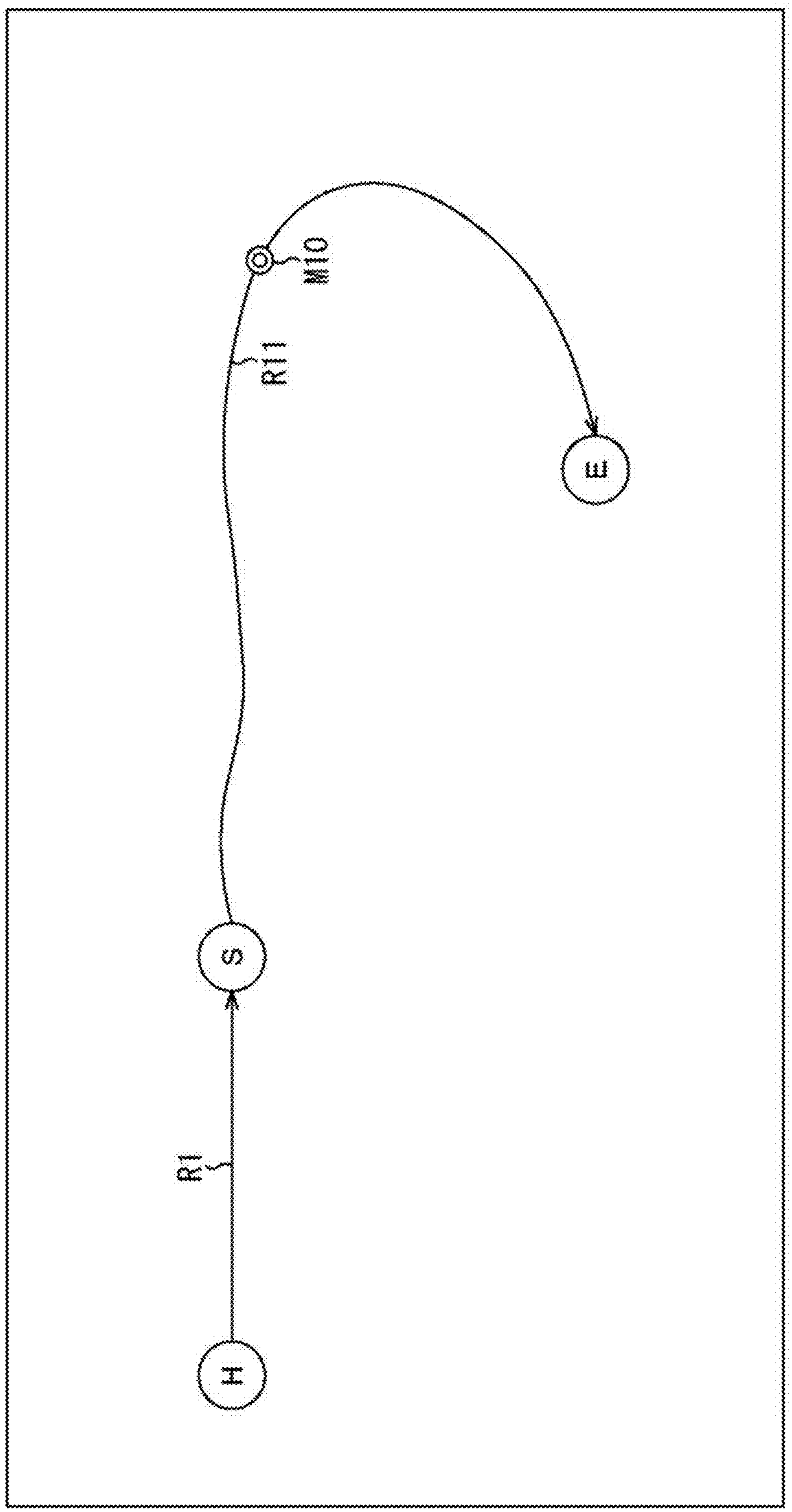
FIG. 7 is a diagram illustrating a display example of a modified plan.

FIG. 7 is a diagram illustrating a first display example of a modified plan.

In FIG. 7, a flight route R11, which is the flight route R2 of FIG. 3 modified to be moved (shifted) to the left in FIG. 7, is illustrated. An icon M10 indicating the current flight position of the mobile body 10 is illustrated on the flight route R11, and the icon M10 moves along the flight route R11 as the mobile body 10 automatically flies.

With this, the user can know the modified flight route.

Figure 8:
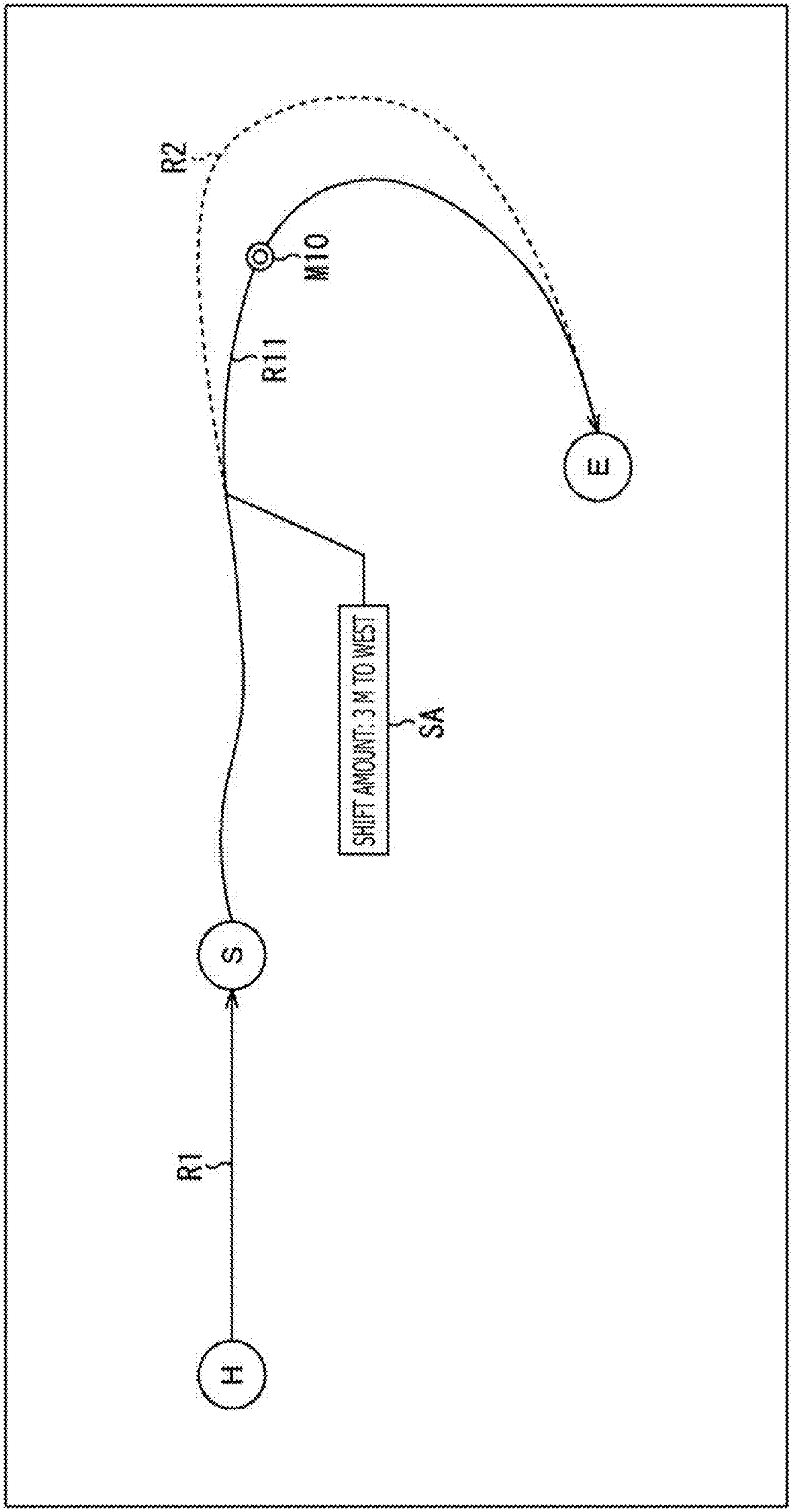
FIG. 8 is a diagram illustrating a display example of a modified plan.

FIG. 8 is a diagram illustrating a second display example of a modified plan.

In FIG. 8, similar to FIG. 7, the flight route R11, which is the flight route R2 of FIG. 3 modified to be moved (shifted) to the left in FIG. 8 as a whole, is illustrated together with the flight route R2 (dotted line) used before modification.

With this, the user can know how the flight route before modification has been modified.

Note that, other than the modified flight route R11 being drawn, as illustrated in FIG. 8, a numerical value SA representing the modification amount (shift amount) of the modified flight route may also be displayed. In the example of FIG. 8, as the numerical value SA, it is illustrated that the flight route R2 before modification has been shifted 3 *m* to the west.

Figure 9:
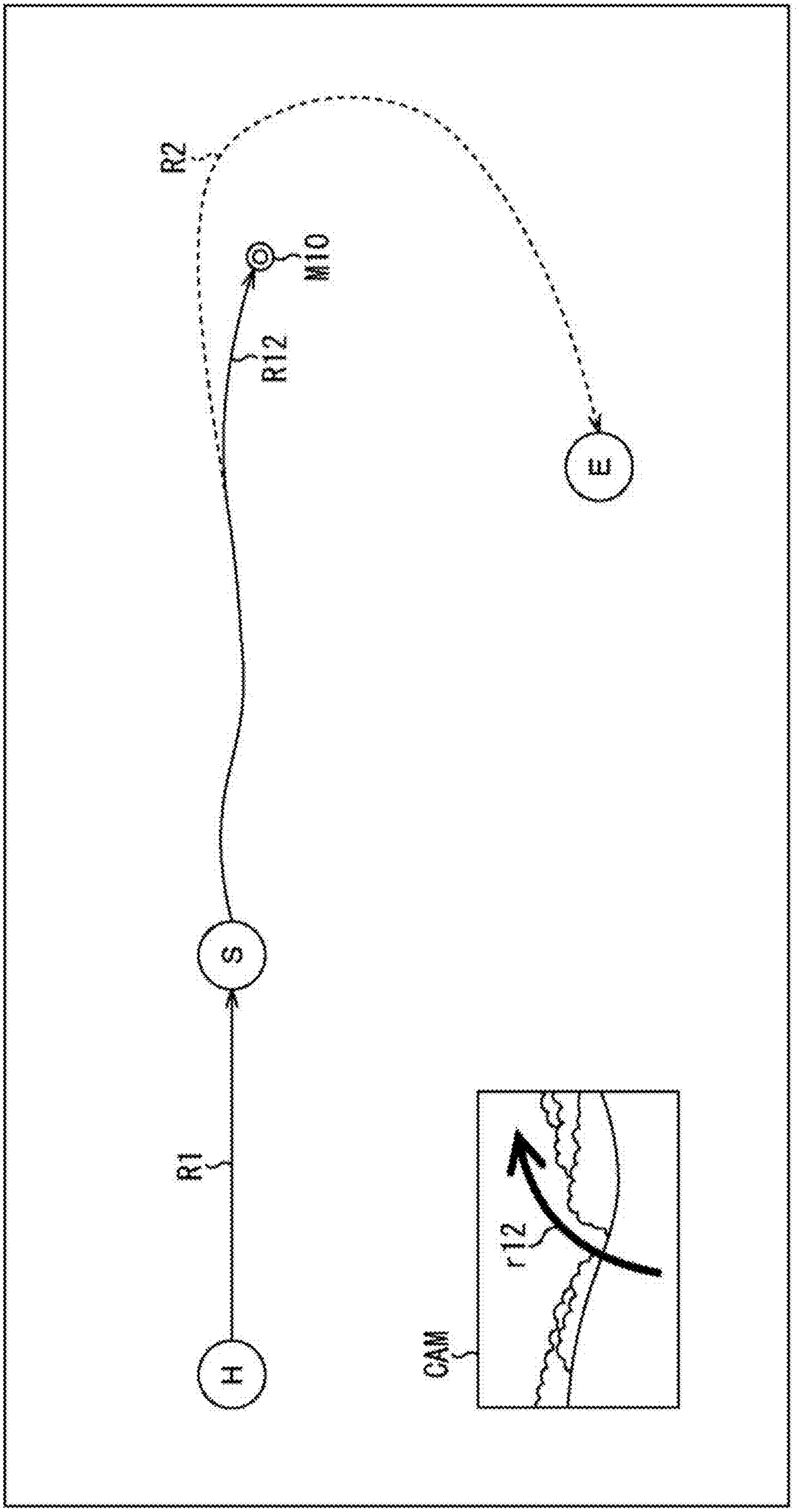
FIG. 9 is a diagram illustrating a display example of a modified plan.

FIG. 9 is a diagram illustrating a third display example of a modified plan.

In FIG. 9, a flight route R12, which is the flight route R2 of FIG. 3 sequentially modified in reference to input modification information, is indicated by the arrow. The icon M10 indicating the current flight position of the mobile body 10 is illustrated at the distal end of the flight route R12, and the icon M10 moves in accordance with the route following the input modification information. In FIG. 9 as well, the flight route R2 before modification is indicated by the dotted line.

Further, as illustrated in FIG. 9, together with the flight route of the mobile body 10, an FPV (First Person View) camera image CAM captured by a front camera or a gimbal camera, which are not illustrated, may be displayed. In this case, an arrow r12 representing the modified flight route R12 may be displayed to be superimposed on the camera image CAM.

Figure 10:
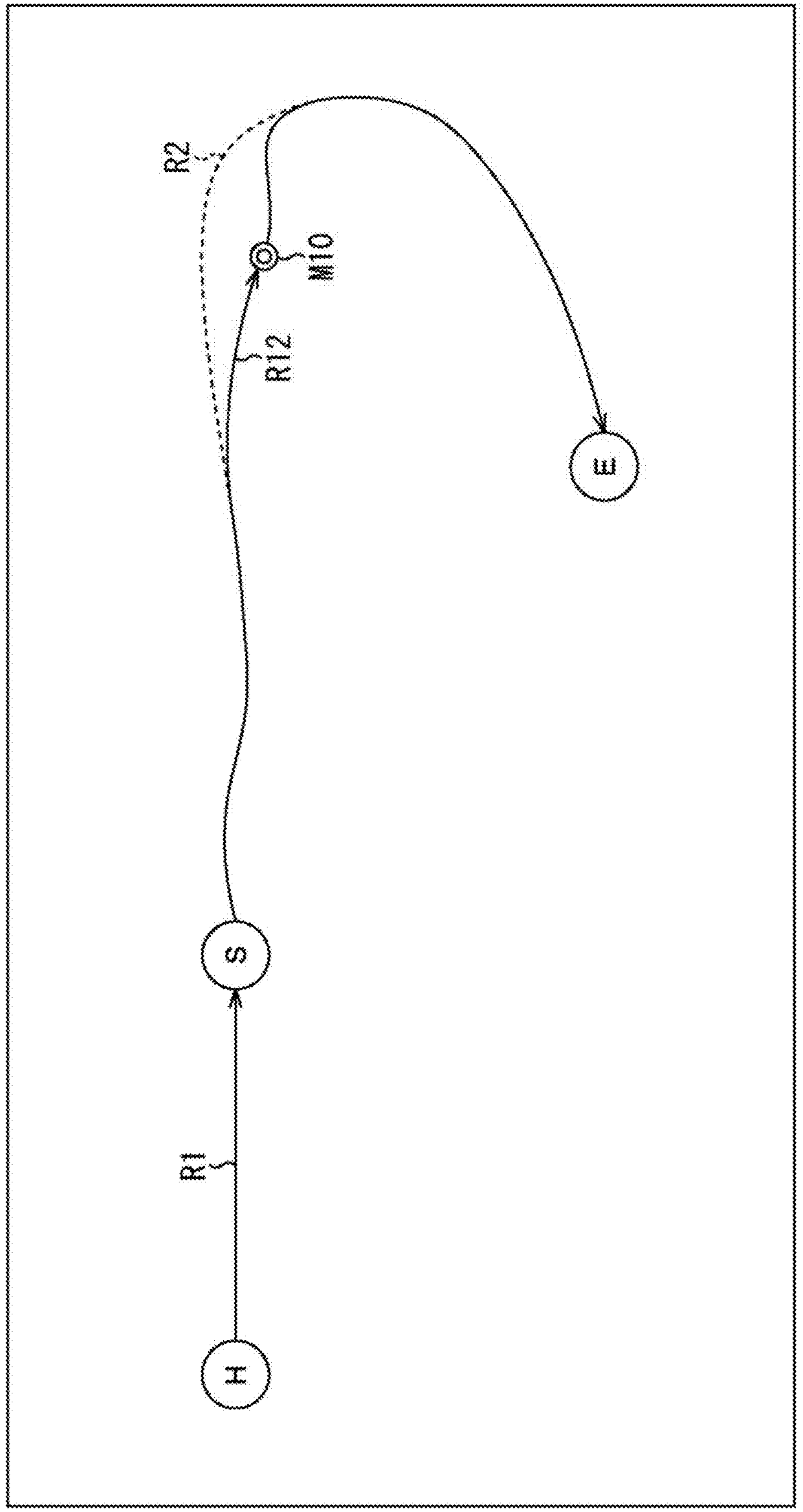
FIG. 10 is a diagram illustrating a display example of a modified plan.

In the example of FIG. 9, for example, while the modification information is continuously input, such as when the user continues to operate the operation stick (operation unit 21) of the transmitter 20, the mobile body 10 moves along the route following that modification information. On the other hand, when the modification information is no longer input, such as when the user stops operating the operation stick (operation unit 21) of the transmitter 20, as illustrated in FIG. 10, the mobile body 10 automatically flies to follow the flight route R2 used before modification (returns to the original flight route R2), and that state is displayed on the ground-based device.

Figure 11:
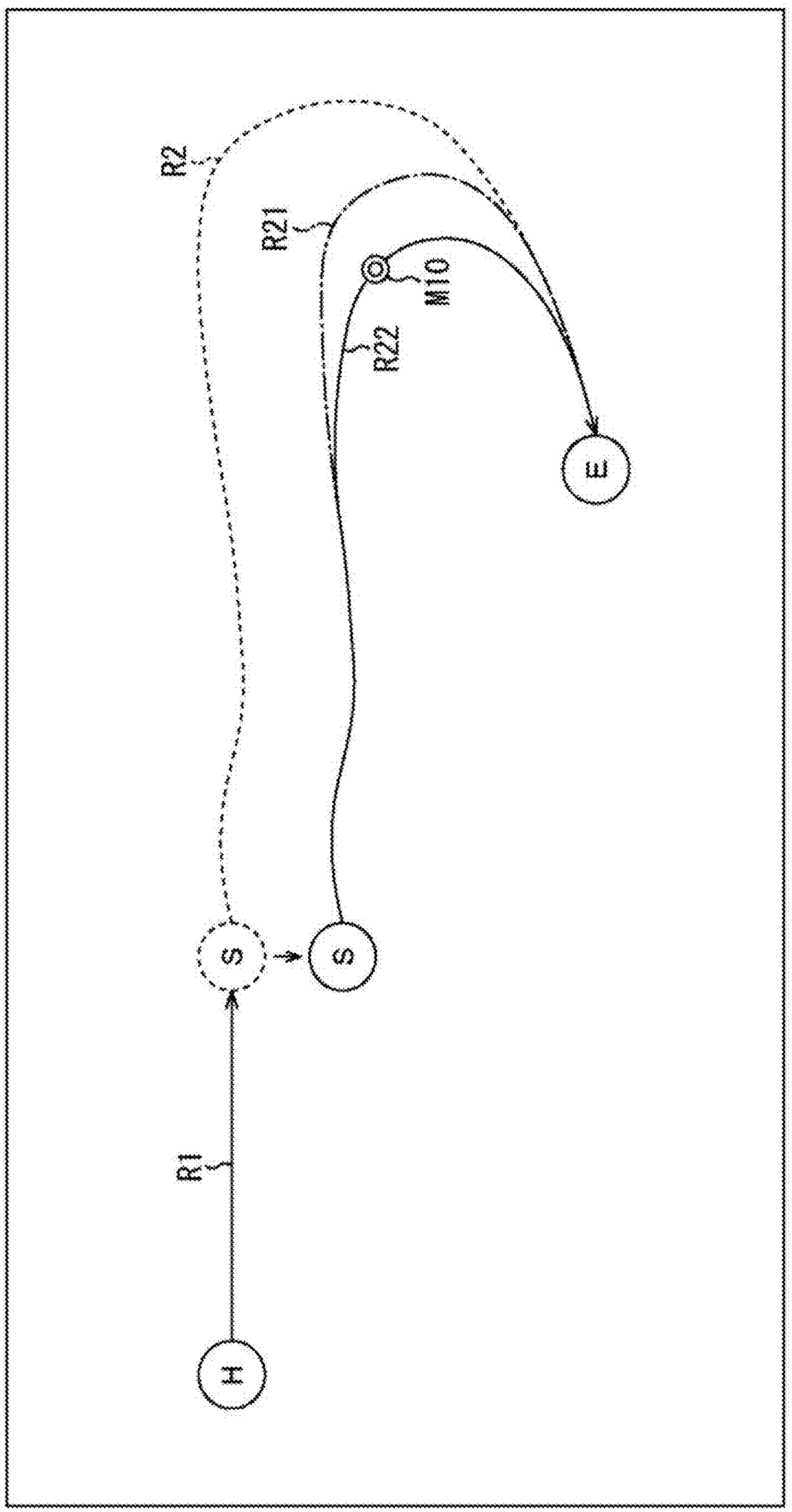
FIG. 11 is a diagram illustrating a display example of a modified plan.

FIG. 11 is a diagram illustrating a fourth display example of a modified plan.

In FIG. 11, a flight route R21, which is the flight route R2 of FIG. 3 modified in reference to modification information input during the route flight standby of the mobile body 10, and a flight route R22, which is that flight route R21 modified to be moved (shifted) to the left in FIG. 11, are illustrated. The icon M10 indicating the current flight position of the mobile body 10 is illustrated on the flight route R22, and the icon M10 moves along the flight route R22 as the mobile body 10 automatically flies.

With this, the user can know how the flight route set before flight and the flight route set (modified) during route flight standby have each been modified.

Note that the display examples of modified plans are not limited to those described above. For example, the display examples of FIG. 8 to FIG. 11 may be combined and displayed as appropriate, or only a part of any of them may be displayed.

In the following, the configurations of embodiments of the above-mentioned mobile body control system 1 are described.

3. First Embodiment

It is an object of a drone system of the present embodiment to achieve the visualization of modified plans.

(Configuration of Drone System)

Figure 12:
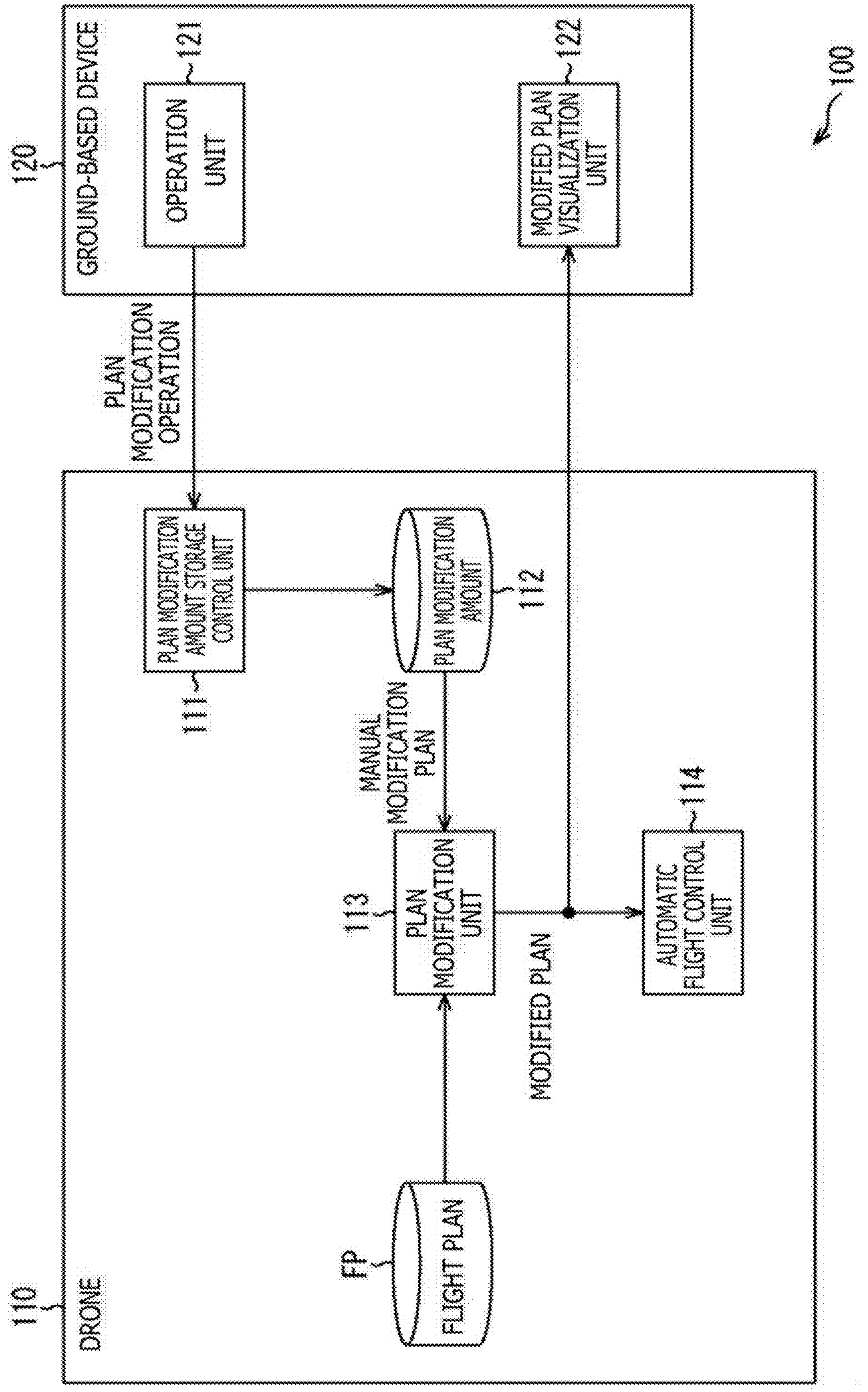
FIG. 12 is a block diagram illustrating the configuration of a drone system of a first embodiment.

FIG. 12 is a block diagram illustrating the configuration of the drone system of the first embodiment of the technology according to the present disclosure.

A drone system 100 illustrated in FIG. 12 includes a drone 110 and a ground-based device 120.

The drone 110 corresponds to the mobile body 10 forming the mobile body control system 1 of FIG. 4 and can automatically fly following a flight route included in a flight plan set in advance.

The drone 110 includes a plan modification amount storage control unit 111, a plan modification amount retention unit 112, a plan modification unit 113, and an automatic flight control unit 114.

The plan modification amount storage control unit 111 converts a flight plan modification operation (plan modification operation) by the user input as modification information (operation information) from the ground-based device 120 during the automatic flight of the drone 110 into a flight plan modification amount (plan modification amount), and causes the plan modification amount retention unit 112 to store the plan modification amount.

The plan modification amount stored (retained) in the plan modification amount retention unit 112 is read out to the plan modification unit 113 as appropriate as a manual modification plan.

The plan modification unit 113 outputs a modified plan obtained by modifying a flight plan FP set in advance and retained by the drone 110, in reference to the manual modification plan read out from the plan modification amount retention unit 112, to the automatic flight control unit 114.

The automatic flight control unit 114 controls the automatic flight of the drone 110 following a modified flight route, in reference to the modified plan output from the plan modification unit 113.

Further, the modified plan including the modification amount from the original flight plan FP is transmitted to the ground-based device 120.

The ground-based device 120 corresponds to the transmitter 20 or the portable terminal 30, which forms the mobile body control system 1 of FIG. 4, and can manage the operation and settings of the drone 110 according to apps installed in advance.

The ground-based device 120 includes an operation unit 121 and a modified plan visualization unit 122.

The operation unit 121 includes operation sticks, switches, buttons, or the like, and receives flight plan modification operations by the user. Plan modification operations, which serve as operation information representing the modification operations in question, are transmitted to the drone 110.

The modified plan visualization unit 122 presents a modified flight route to the user in reference to the modified plan including the modification amount from the original flight plan FP from the drone 110.

(Flow of Processing of Drone System)

Figure 13:
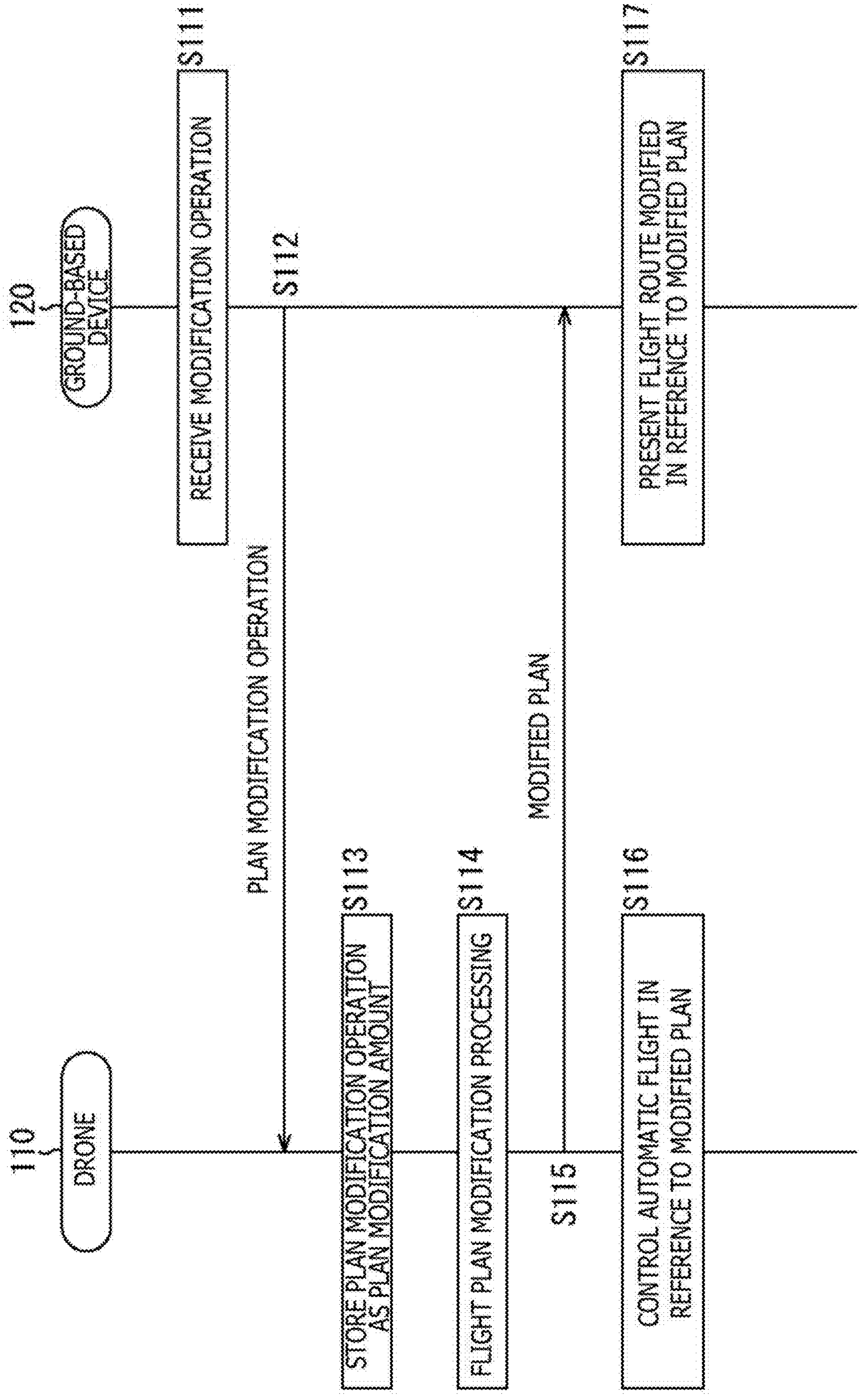
FIG. 13 is a flowchart illustrating the flow of the processing of the drone system.

With reference to the flowchart of FIG. 13, the flow of the processing of the drone system 100 of FIG. 12 is described. The processing of FIG. 13 is executed during the automatic flight of the drone 110 based on a flight plan.

When receiving a flight plan modification operation by the user in Step S111, in Step S112, the ground-based device 120 transmits the plan modification operation to the drone 110.

When receiving the plan modification operation from the ground-based device 120, in Step S113, the drone 110 stores the plan modification operation from the ground-based device 120 as a plan modification amount in the plan modification amount retention unit 112.

In Step S114, the drone 110 executes flight plan modification processing to modify the flight plan FP set in advance, in reference to the plan modification amount stored in the plan modification amount retention unit 112.

In Step S115, the drone 110 transmits the modified plan obtained by the flight plan modification processing to the ground-based device 120.

Then, in Step S116, the drone 110 controls its own automatic flight in reference to the modified plan.

Meanwhile, when receiving the modified plan from the drone 110, in Step S117, the ground-based device 120 presents a modified flight route to the user in reference to the received modified plan.

With the processing described above, it becomes possible to achieve real-time notification to the user of a flight plan modified during the automatic flight of the drone, and to allow the user to easily know the modified flight plan.

(Modified Example of Drone System)

Figure 14:
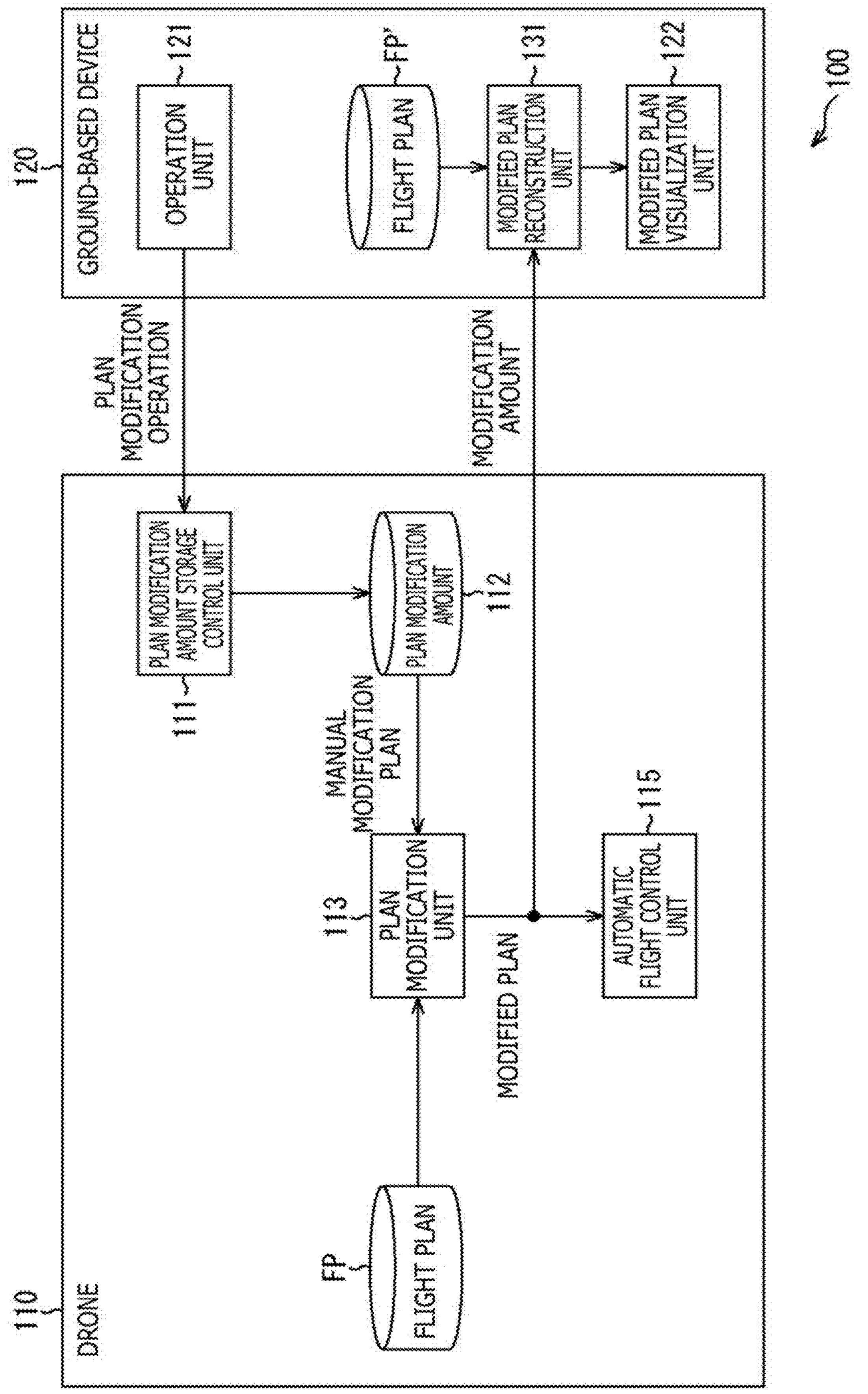
FIG. 14 is a block diagram illustrating a modified example of the drone system.

FIG. 14 is a block diagram illustrating a modified example of the drone system 100.

Note that, in the drone system 100 of FIG. 14, the components that are identical to the components of the drone system 100 of FIG. 12 are denoted by the same reference signs, and the descriptions thereof are omitted as appropriate.

That is, the drone system 100 of FIG. 14 differs from the drone system 100 of FIG. 12 in that the ground-based device 120 newly includes a modified plan reconstruction unit 131 and retains a flight plan FP' that is the same as the flight plan FP retained by the drone 110.

Note that, in the drone system 100 of FIG. 14, instead of a modified plan including the modification amount from the original flight plan FP, only the modification amount is transmitted from the drone 110 to the ground-based device 120.

The modified plan reconstruction unit 131 creates (reconstructs) the modified plan obtained by flight plan modification processing by the drone 110, in reference to the flight plan FP' retained by the ground-based device 120 and the modification amount from the drone 110.

The modified plan visualization unit 122 presents a modified flight route to the user in reference to the reconstructed modified plan.

With the configuration described above, it is possible to present a modified flight route to the user by only sending and receiving the modification amount from the original flight plan FP, rather than the entire modified plan, between the drone 110 and the ground-based device 120. That is, it becomes possible to notify the user of the modified flight plan with less communication volume.

4. Second Embodiment

For the drone in automatic flight based on a flight plan, the user can intervene by manual operation by operating the operation stick of the transmitter.

However, it is difficult to precisely modify the flight route by manual operation in a similar manner to, for example, drawing a flight route on the app of the ground-based device, for the purpose of a flight desired by the user. Further, it is also difficult to instantly modify the flight route by manual operation, such as when avoiding obstacles.

Therefore, it is an object of a drone system of the present embodiment to achieve a flight desired by the user even in a case where intervention by manual operation has been performed on the drone during automatic flight.

(Configuration of Drone System)

Figure 15:
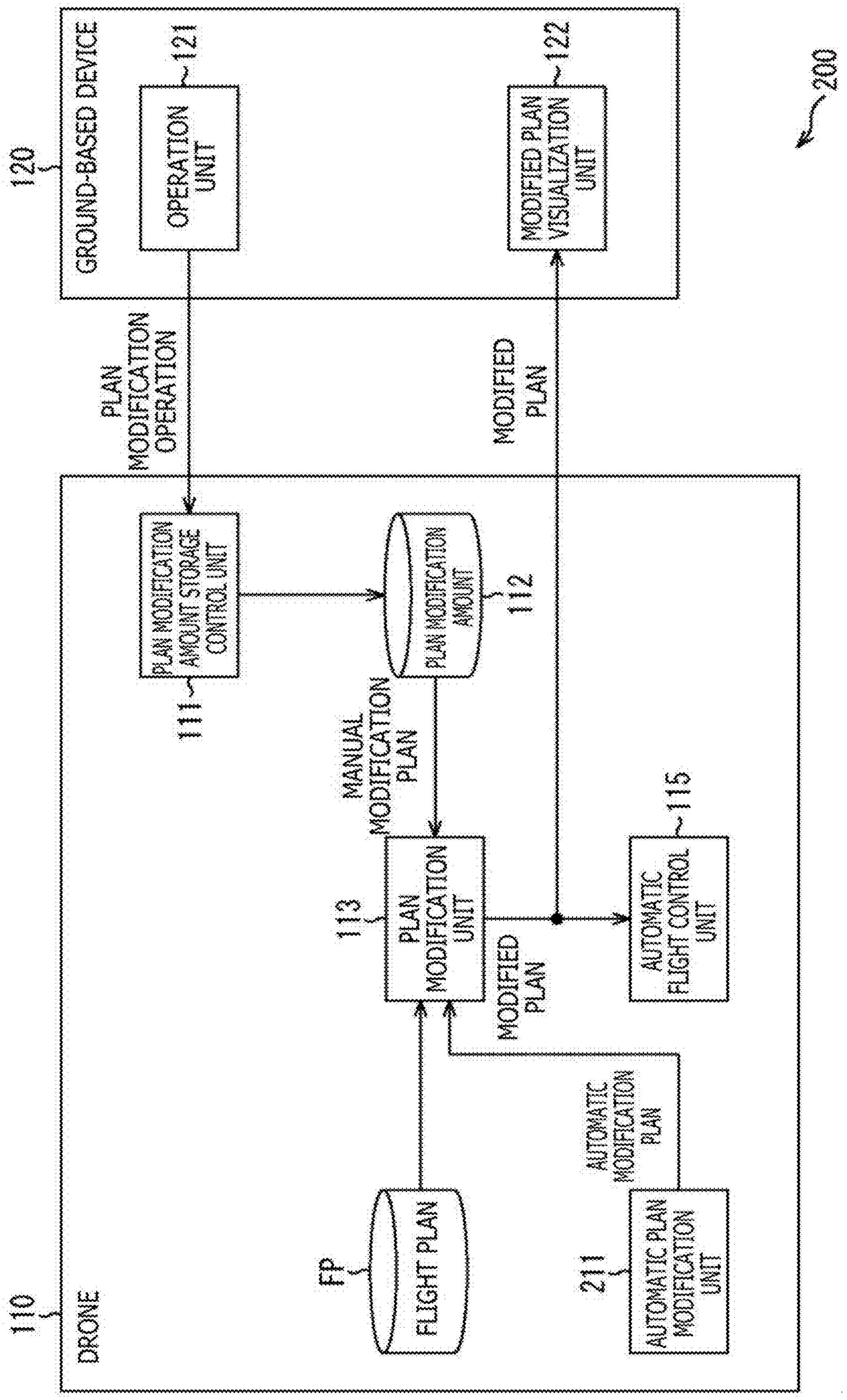
FIG. 15 is a block diagram illustrating the configuration of a drone system of a second embodiment.

FIG. 15 is a block diagram illustrating the configuration of the drone system of the second embodiment of the technology according to the present disclosure.

Note that, in a drone system 200 of FIG. 15, the components that are identical to the components of the drone system 100 of FIG. 12 are denoted by the same reference signs, and the descriptions thereof are omitted as appropriate.

That is, the drone system 200 of FIG. 15 differs from the drone system 100 of FIG. 12 in that the drone 110 newly includes an automatic plan modification unit 211.

The automatic plan modification unit 211 acquires a plan modification amount different from a plan modification amount (manual modification plan) stored (retained) in the plan modification amount retention unit 112, and outputs the different plan modification amount as an automatic modification plan to the plan modification unit 113.

The plan modification unit 113 appropriately modifies the flight plan FP retained by the drone 110, in reference to the manual modification plan read out from the plan modification amount retention unit 112 and the automatic modification plan output from the automatic plan modification unit 211. The modified flight plan is supplied to the automatic flight control unit 115 as an appropriate modified plan that enables a flight desired by the user, which cannot be achieved by the user's intervention by manual operation alone.

In the following, specific configuration examples of the drone system 200 described above are described.

(First Specific Configuration Example of Drone System)

Figure 16:
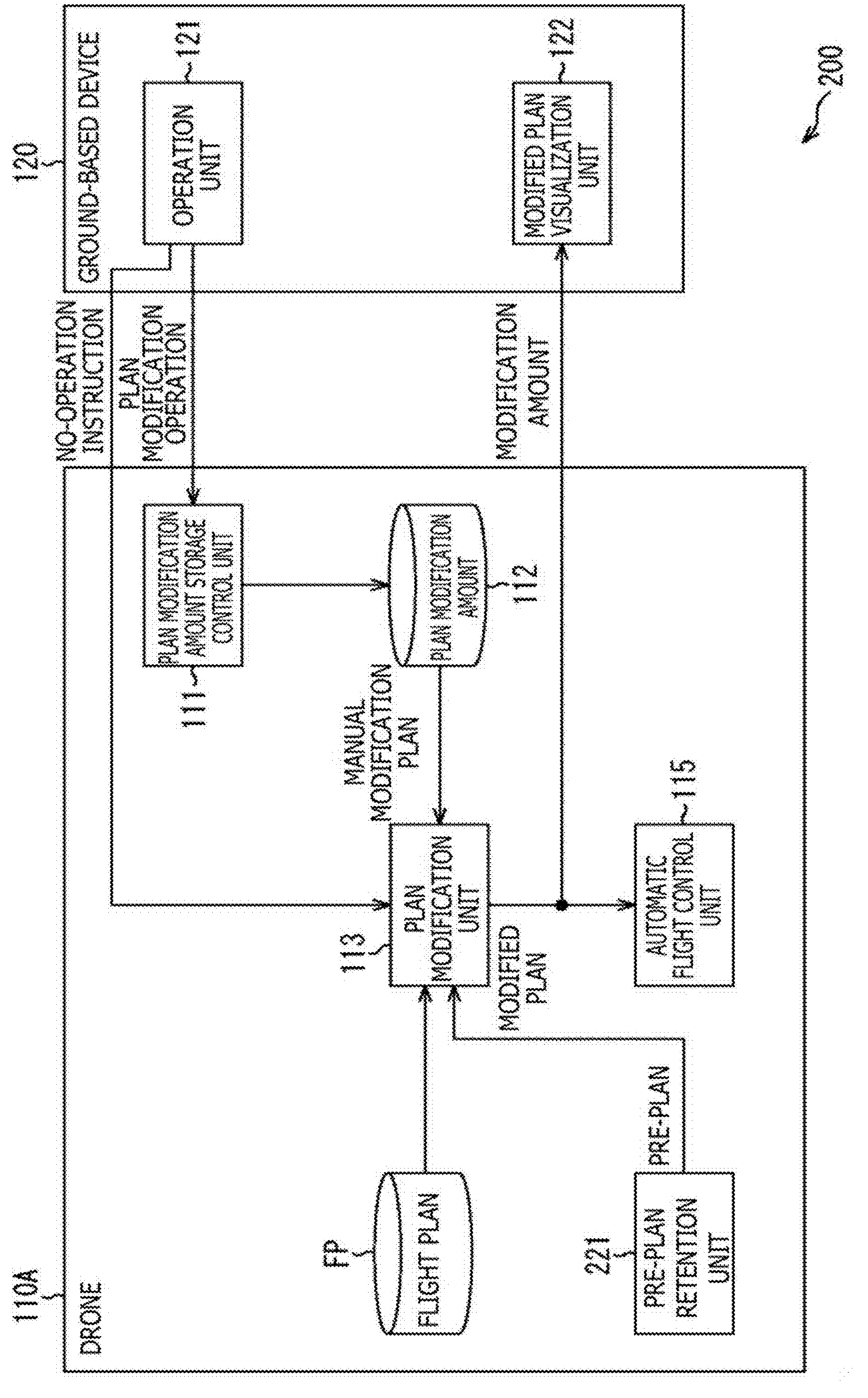
FIG. 16 is a block diagram illustrating a first specific configuration example of the drone system.

FIG. 16 is a block diagram illustrating a first specific configuration example of the drone system 200.

In the drone system 200 of FIG. 16, a drone 110A includes a pre-plan retention unit 221 as the automatic plan modification unit 211 of FIG. 15.

The pre-plan retention unit 221 retains a pre-plan, which is a flight plan set before the flight of the drone 110A. The pre-plan may be the flight plan FP itself, which has been set in advance and retained by the drone 110A, or may be the flight plan FP modified in reference to operation information input during the pre-route flight standby of the drone 110A.

The pre-plan retained in the pre-plan retention unit 221 is read out to the plan modification unit 113 as appropriate.

Further, in the drone system 200 of FIG. 16, the operation unit 121 of the ground-based device 120 outputs, to the drone 110A, a no-operation instruction indicating that there is no plan modification operation by the user. The no-operation instruction is output when it is detected that, for example, the stick values in the directions of all four axes of the operation stick, which serves as the operation unit 121, are smaller than a predetermined threshold.

The plan modification unit 113 determines whether to modify the flight plan FP in reference to either the manual modification plan of the plan modification amount retention unit 112 or the pre-plan of the pre-plan retention unit 221, depending on whether there is an input of a no-operation instruction from the ground-based device 120 or not.

Figure 17:
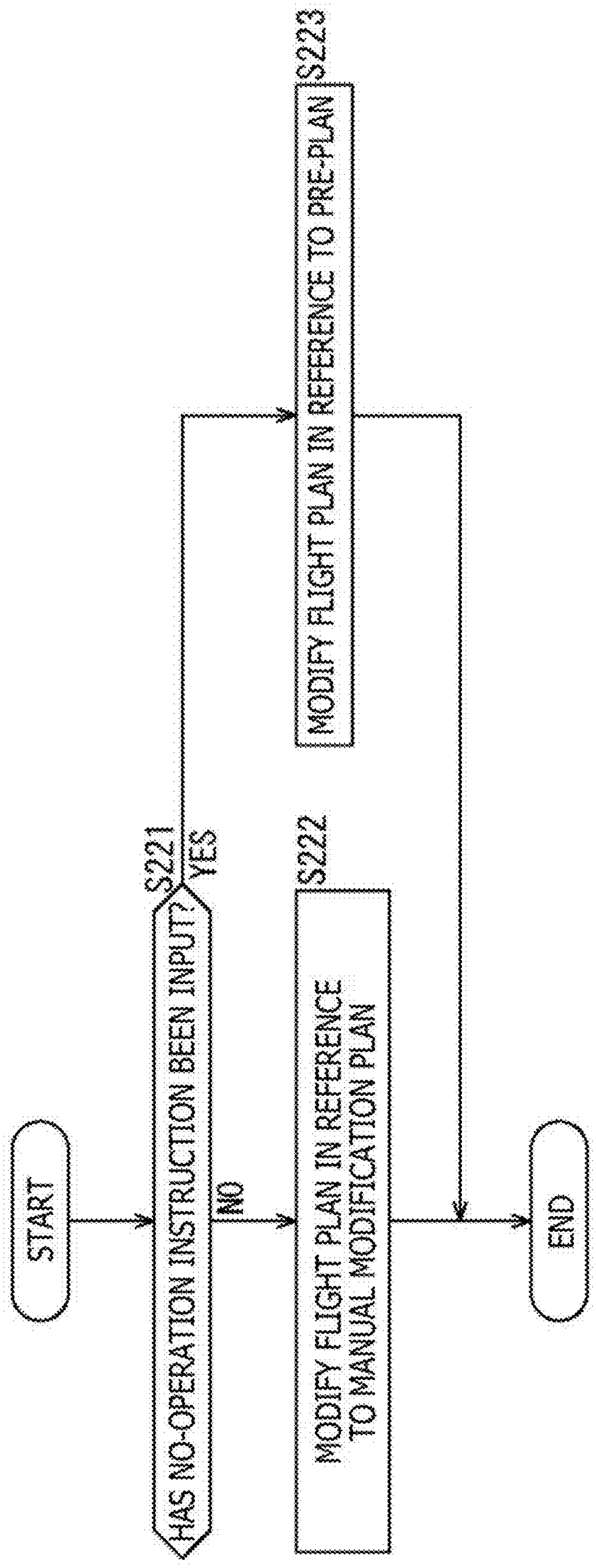
FIG. 17 is a flowchart illustrating the flow of flight plan modification processing.

Here, with reference to the flowchart of FIG. 17, the flow of flight plan modification processing by the drone 110A is described.

In Step S221, the plan modification unit 113 of the drone 110A determines whether a no-operation instruction has been input from the ground-based device 120 or not.

In a case where it is determined in Step S221 that a no-operation instruction has not been input, that is, in a case where a plan modification operation, which serves as operation information, has been input, the processing proceeds to Step S222.

In Step S222, the plan modification unit 113 modifies the flight plan FP in reference to a manual modification plan retained in the plan modification amount retention unit 112. That is, in a case where operation information has been input, the plan modification unit 113 outputs a modified plan obtained through modification in reference to the operation information.

On the other hand, in a case where it is determined in Step S221 that a no-operation instruction has been input, that is, in a case where a plan modification operation, which serves as operation information, has not been input, the processing proceeds to Step S223.

In Step S223, the plan modification unit 113 modifies the flight plan FP in reference to a pre-plan retained in the pre-plan retention unit 221. That is, in a case where operation information has not been input, for example, the plan modification unit 113 outputs the flight plan FP used before modification as it is or outputs the flight plan FP modified during pre-route flight standby.

With this, as described with reference to FIG. 10, when the user stops operating the operation stick of the transmitter, the drone 110A automatically flies to follow the flight route used before modification (returns to the original flight route).

With the configuration and the processing described above, when there is no modification operation by the user, the drone automatically flies according to a precise flight route drawn in advance by the user. That is, it becomes possible to achieve a delicate flight desired by the user, which cannot be achieved by the user's intervention by manual operation alone.

Further, not only a flight route changed by modification operations by the user, but also a flight route changed without any modification operation by the user is presented to the user in real time. With this, the user can know not only how he/she has modified the flight route himself/herself, but also how the system has modified the flight route, so that he/she can continue the flight of the drone with peace of mind.

(Second Specific Configuration Example of Drone System)

Figure 18:
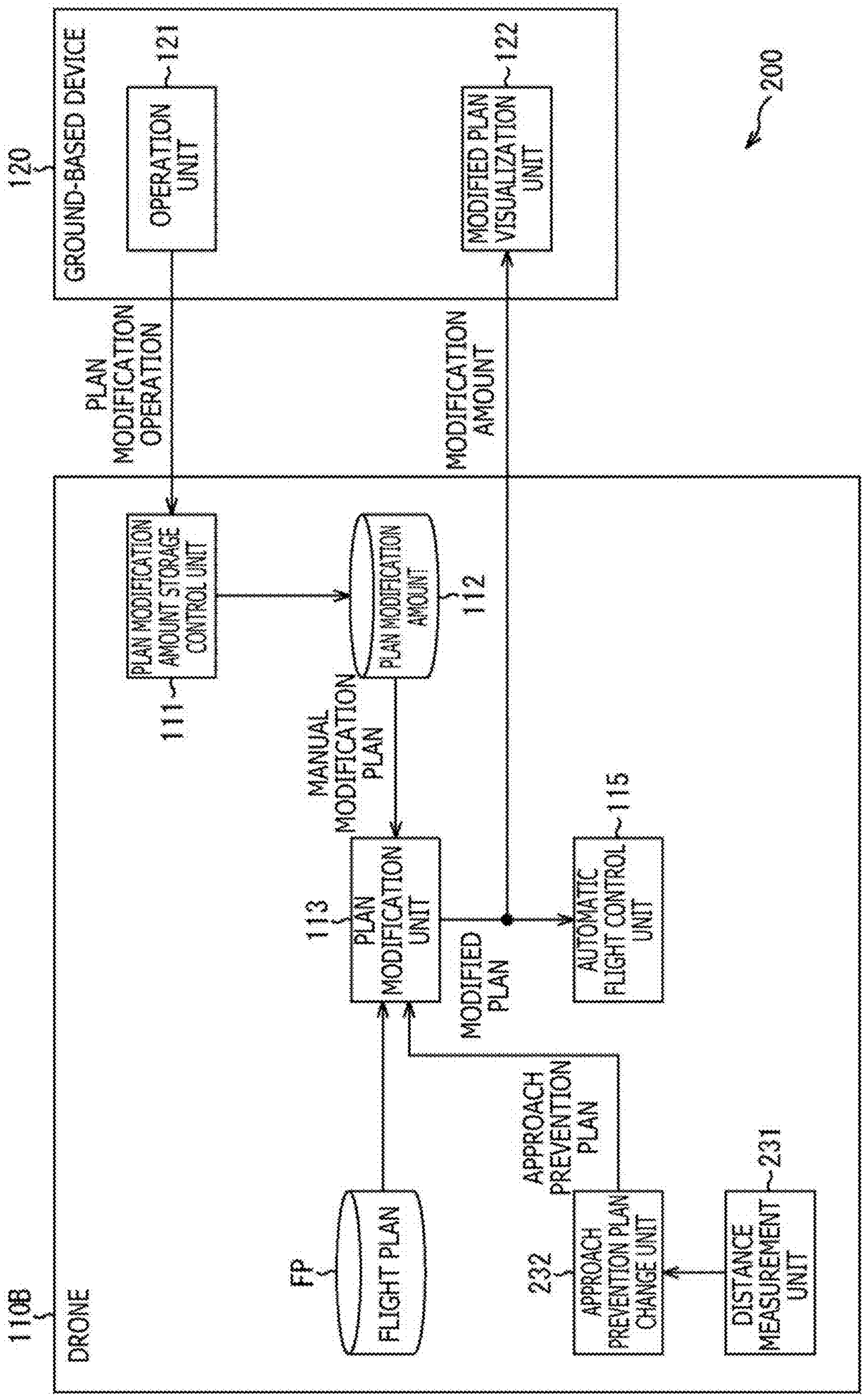
FIG. 18 is a block diagram illustrating a second specific configuration example of the drone system.

FIG. 18 is a block diagram illustrating a second specific configuration example of the drone system 200.

In the drone system 200 of FIG. 18, a drone 110B newly includes a distance measurement unit 231 and an approach prevention plan change unit 232, which serves as the automatic plan modification unit 211 of FIG. 15.

The distance measurement unit 231 is a distance measurement sensor that can measure the distance to an approach avoidance target, which is an object that the drone 110B is to avoid approaching. The distance measurement unit 231 includes, for example, a stereo camera, LiDAR (Light Detection And Ranging), a millimeter-wave radar, or a ToF (Time of Flight) sensor mounted on the drone 110B. The distance measurement unit 231 supplies sensor information obtained by distance measurement to the approach prevention plan change unit 232.

The approach avoidance target may be, for example, an obstacle existing in the flight environment of the drone 110B, or may be a geofence, which is a flight restricted area set for the drone 110B.

The approach prevention plan change unit 232 inputs distance information which represents a certain distance to be maintained between the drone 110B and the approach avoidance target, as modification information (surrounding information), to the plan modification unit 113, as an approach prevention plan, in reference to the sensor information acquired by the distance measurement unit 231.

Specifically, the approach prevention plan change unit 232 determines whether the drone 110B and the approach avoidance target have approached each other to reach a threshold distance determined in advance or not, in reference to the sensor information from the distance measurement unit 231. Then, in a case where the drone 110B and the approach avoidance target have approached each other within the threshold distance, the approach prevention plan change unit 232 inputs the approach prevention plan (distance information) to the plan modification unit 113.

Note that the approach prevention plan change unit 232 may determine whether the drone 110B and the approach avoidance target have approached each other within the threshold distance or not, in reference to, in addition to the sensor information from the distance measurement unit 231, the self-position of the drone 110B estimated using the sensor information.

The plan modification unit 113 determines whether to modify the flight plan FP or not, in reference to only a manual modification plan from the plan modification amount retention unit 112, depending on whether there is an input of an approach prevention plan from the approach prevention plan change unit 232 or not.

Figure 19:
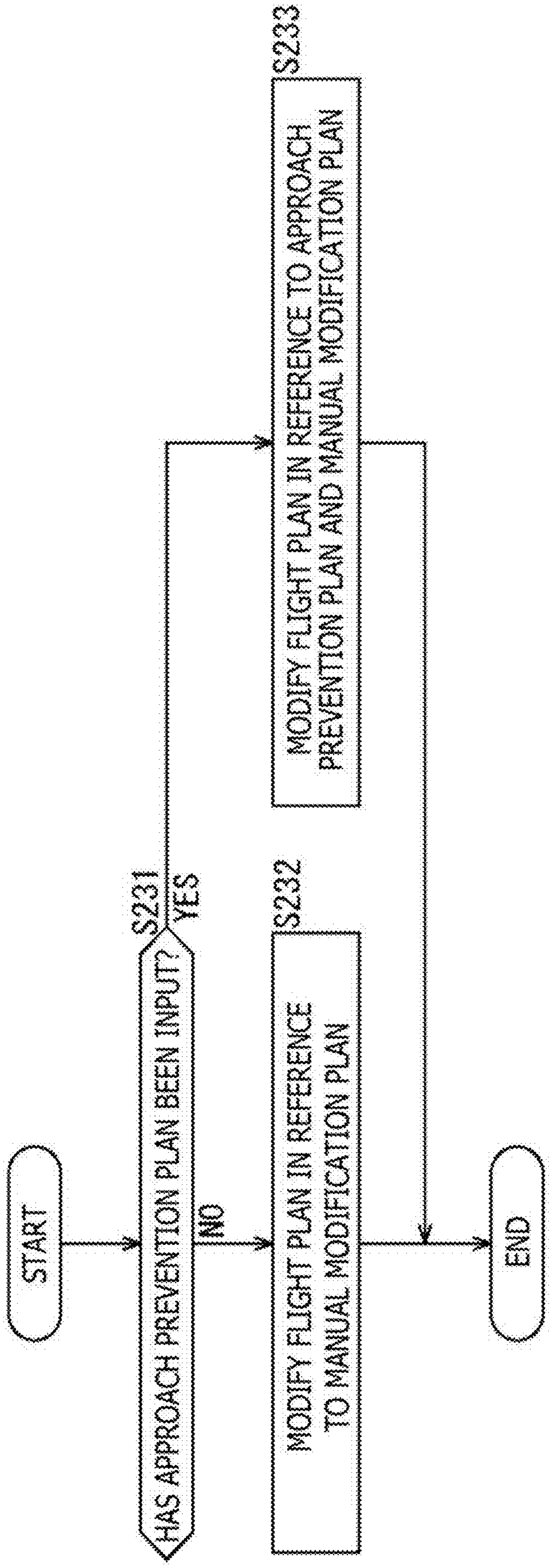
FIG. 19 is a flowchart illustrating the flow of flight plan modification processing.

Here, with reference to the flowchart of FIG. 19, the flow of flight plan modification processing by the drone 110B is described.

In Step S231, the plan modification unit 113 of the drone 110B determines whether an approach prevention plan (distance information) has been input from the approach prevention plan change unit 232 or not.

In a case where it is determined in Step S231 that an approach prevention plan has not been input, that is, in a case where the drone 110B and the approach avoidance target have not approached each other within the threshold distance, the processing proceeds to Step S232.

In Step S232, the plan modification unit 113 modifies the flight plan FP in reference to a manual modification plan corresponding to a plan modification operation. Note that, in a case where a plan modification operation (operation information) has not been input, the plan modification unit 113 outputs the flight plan FP set in advance as it is.

On the other hand, in a case where it is determined in Step S231 that an approach prevention plan has been input, that is, in a case where the drone 110B and the approach avoidance target have approached each other within the threshold distance, the processing proceeds to Step S233.

In Step S233, the plan modification unit 113 modifies the flight plan FP in reference to the approach prevention plan and the manual modification plan. Specifically, the plan modification unit 113 further modifies the modified plan obtained by modifying the flight plan FP based on the manual modification plan, in reference to the approach prevention plan. Note that, in a case where a plan modification operation (operation information) has not been input, the plan modification unit 113 outputs the modified plan obtained by modifying the flight plan FP, in reference to only the approach prevention plan.

Figure 20:
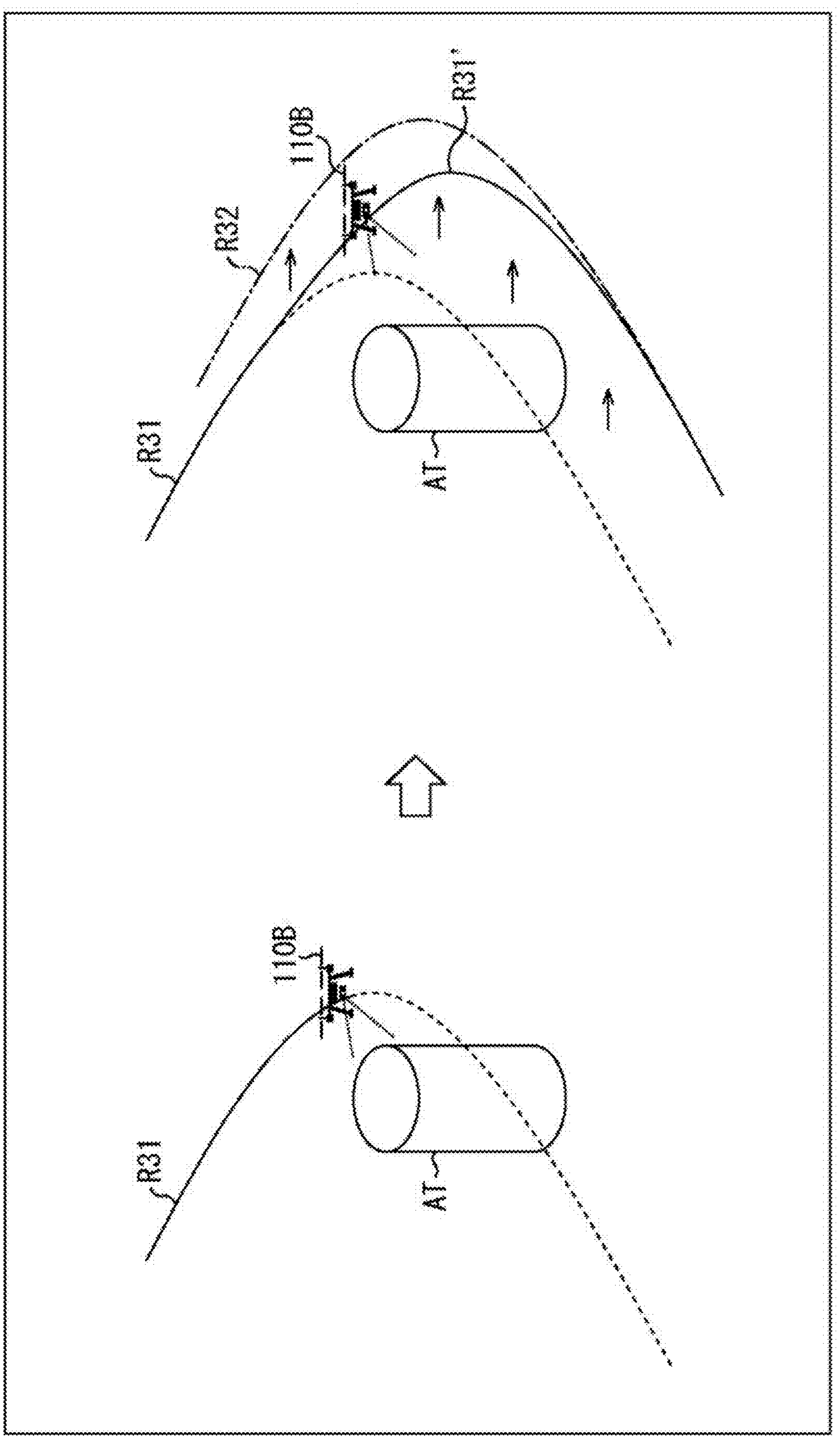
FIG. 20 is a diagram illustrating an example of flight plan modification based on an approach prevention plan.

It is assumed that, for example, as illustrated in the left part of FIG. 20, when the drone 110B is automatically flying to follow a flight route R31, the distance to an obstacle AT approaches the threshold distance.

In this case, as illustrated in the right part of FIG. 20, a modified plan including a flight route R32, which is obtained by moving (shifting) position information representing the flight route R31 in a direction away from the obstacle AT by a certain distance represented by an approach prevention plan (distance information), is sequentially created. The drone 110B can continue to automatically fly to follow the flight route R32, which avoids a collision with the obstacle AT, by flying a route R31' for a transition from the flight route R31 to the flight route R32.

With the configuration and the processing described above, when approaching an approach avoidance target within the threshold distance, the drone automatically flies according to a flight route that instantly avoids approach with the approach avoidance target. That is, it is possible to achieve a safe flight desired by the user, which cannot be achieved by the user's intervention by manual operation alone.

Further, not only a flight route changed by a modification operation by the user, but also a flight route changed without any modification operation by the user is presented to the user in real time. With this, the user can know not only how he/she has modified the flight route himself/herself, but also how the system has modified the flight route, so that he/she can continue the flight of the drone with peace of mind.

5. Configuration Example of Computer

The series of processing processes described above can be executed by hardware or software. In a case where the series of processing processes is executed by software, a program configuring that software is installed on a computer. Here, examples of the computer include computers incorporated in dedicated hardware and, for example, general-purpose personal computers capable of executing various functions with various programs installed thereon.

Figure 21:
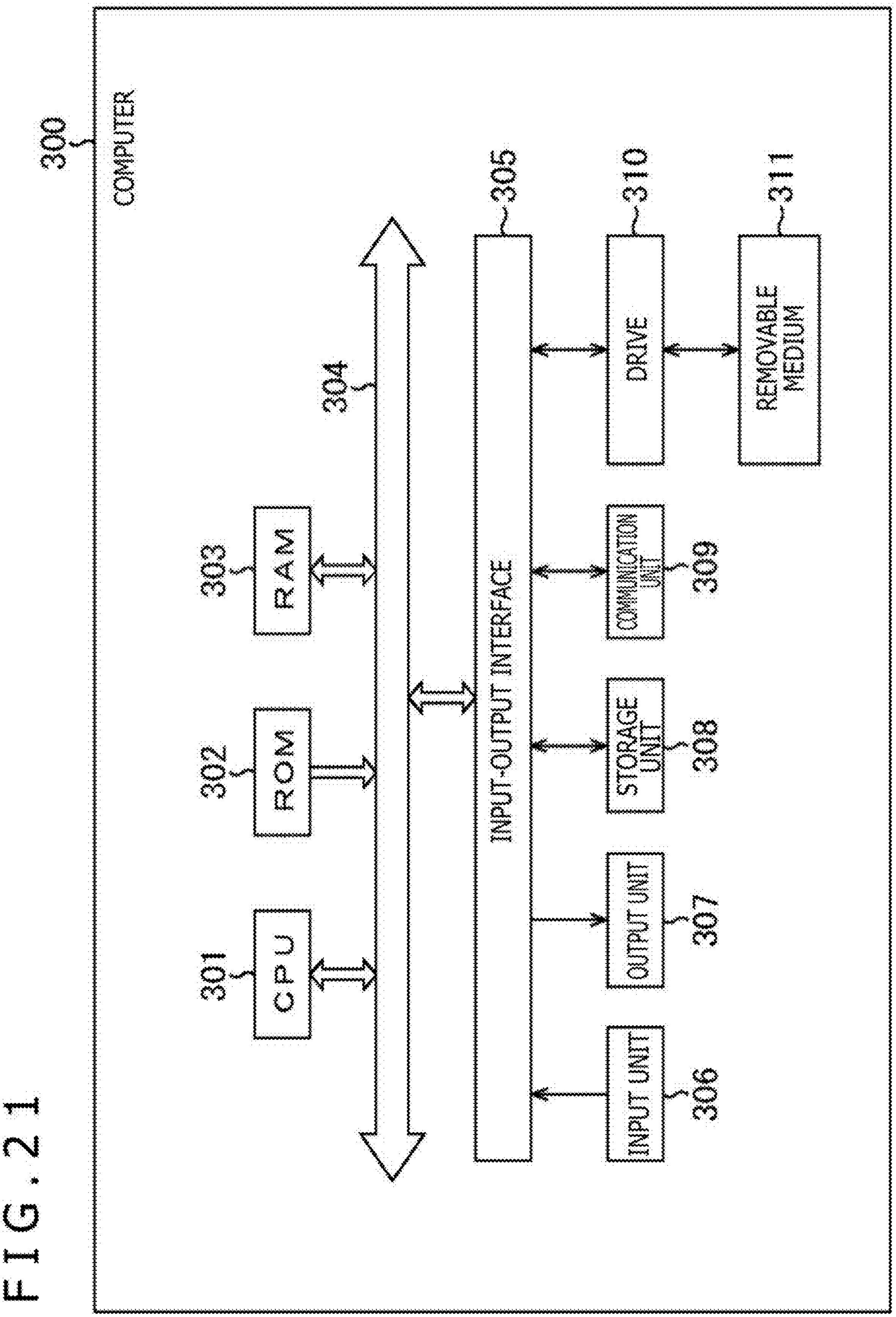
FIG. 21 is a diagram illustrating a configuration example of a computer.

FIG. 21 is a block diagram illustrating a configuration example of the hardware of a computer configured to execute the series of processing processes described above by the program.

In a computer 300, a CPU 301, a ROM (Read Only Memory) 302, and a RAM (Random Access Memory) 303 are connected to each other through a bus 304.

An input-output interface 305 is further connected to the bus 304. The input-output interface 305 is connected to an input unit 306, an output unit 307, a storage unit 308, a communication unit 309, and a drive 310.

The input unit 306 includes a keyboard, a mouse, a microphone, or the like. The output unit 307 includes a display, a speaker, or the like. The storage unit 308 includes a hard disk, a non-volatile memory, or the like. The communication unit 309 includes a network interface or the like. The drive 310 drives a removable medium 311 such as a magnetic disk, an optical disc, a magneto-optical disk, or a semiconductor memory.

In the computer 300 configured as described above, for example, the CPU 301 loads the program stored in the storage unit 308 into the RAM 303 through the input-output interface 305 and the bus 304 and executes the program to perform the series of processing processes described above.

The program that the computer 300 (CPU 301) executes can be recorded on the removable medium 311, which serves as a package medium or the like, to be provided, for example. Further, the program can be provided via a wired or wireless transmission medium such as a local area network, the Internet, or digital satellite broadcasting.

In the computer 300, the program can be installed on the storage unit 308 through the input-output interface 305 with the removable medium 311 mounted on the drive 310. Further, the program can be received by the communication unit 309 via a wired or wireless transmission medium to be installed on the storage unit 308. Besides, the program can be installed on the ROM 302 or the storage unit 308 in advance.

Note that the program that the computer executes may be a program whose processing processes are performed chronologically in the order described herein or in parallel. Alternatively, the program may be a program whose processing processes are performed at necessary timing such as when the program is called.

Embodiments of the present technology are not limited to the embodiments described above, and various modifications can be made without departing from the gist of the present technology.

For example, the present technology can employ the configuration of cloud computing in which a single function is shared and collaboratively processed by multiple apparatuses via a network.

Further, each step of the flowcharts described above can be executed by a single apparatus or can be shared and executed by multiple apparatuses.

Moreover, in a case where multiple processing processes are included in a single step, the multiple processing processes included in the single step can be executed by a single apparatus or can be shared and executed by apparatuses.

Further, the effects described herein are merely exemplary and not limiting, and there may be other effects.

Furthermore, the technology according to the present disclosure can take the following configurations.

(1)

An information processing method including:

outputting, in reference to modification information input during automatic movement of a mobile body based on a movement plan, a modified plan obtained by modifying the movement plan; and displaying the modified plan during the automatic movement of the mobile body based on the modified plan.

(2)

The information processing method according to (1), in which a movement route of the mobile body included in the movement plan is modified in reference to the modification information, and the movement route modified is displayed as the modified plan.

(3)

The information processing method according to (2), in which position information representing the movement route is modified as a whole in reference to the modification information, and the movement route represented by the position information modified as a whole is displayed as the modified plan.

(4)

The information processing method according to (2), in which position information representing the movement route is sequentially modified in reference to the modification information, and the movement route represented by the position information sequentially modified is sequentially displayed as the modified plan.

(5)

The information processing method according to any one of (2) through (4), in which the movement route before modification is displayed together with the movement route modified.

(6)

The information processing method according to (5), in which the movement route before modification includes at least one of a first movement route set before movement of the mobile body and a second movement route set during automatic movement standby of the mobile body, and at least one of the first movement route and the second movement route is displayed together with the movement route modified.

(7)

The information processing method according to (6), in which the second movement route is the first movement route modified in reference to the modification information input during the automatic movement standby of the mobile body.

(8)

The information processing device according to (1), in which a movement route of the mobile body included in the movement plan is modified in reference to the modification information, and a numerical value representing a modification amount of the movement route modified is displayed as the modified plan.

(9)

The information processing method according to any one of (1) through (8), in which the modification information includes operation information representing a modification operation for the movement plan by a user, and the modified plan modified in reference to the operation information is output.

(10)

The information processing method according to (9), in which, in a case where the operation information has been input, the modified plan modified in reference to the operation information is output, and, in a case where the operation information has not been input, the movement plan before modification is output as it is.

(11)

The information processing method according to (9), in which the operation information is input from a ground-based device capable of communicating with the mobile body.

(12)

The information processing method according to any one of (1) through (8), in which the modification information includes surrounding information representing a situation around the mobile body.

(13)

The information processing method according to (12), in which the surrounding information includes distance information representing a certain distance to be maintained between the mobile body and an approach avoidance target, and the modified plan modified in reference to the distance information is output.

(14)

The information processing method according to (13), in which the distance information is input in a case where the mobile body and the approach avoidance target approach each other within a threshold distance determined in advance.

(15)

The information processing method according to (14), in which whether the mobile body and the approach avoidance target have approached each other within the threshold distance or not is determined in reference to sensor information acquired by a distance measurement sensor mounted on the mobile body.

(16)

The information processing method according to any one of (13) through (15), in which the modification information further includes operation information representing a modification operation for the movement plan by a user, and the modified plan modified in reference to the operation information is further modified in reference to the distance information.

(17)

The information processing method according to any one of (1) through (16), in which the mobile body includes a drone capable of automatic flight based on a flight plan.

(18)

An information processing device including:

a plan modification unit configured to output, in reference to modification information input during automatic movement of a mobile body based on a movement plan, a modified plan obtained by modifying the movement plan; and a display control unit configured to display the modified plan during the automatic movement of the mobile body based on the modified plan.

(19)

A mobile body control system including:

a mobile body;

a plan modification unit configured to output, in reference to modification information input during automatic movement of the mobile body based on a movement plan, a modified plan obtained by modifying the movement plan; and a display control unit configured to display the modified plan during the automatic movement of the mobile body based on the modified plan.

REFERENCE SIGNS LIST

1: Mobile body control system
10: Mobile body
11: Internal sensor
12: External sensor
13: Communication unit
14: Controller
15: Drive unit
16: Storage unit
17: Application processor
20: Transmitter
21: Operation unit
22: Communication unit
30: Portable terminal
31: Control unit
32: Input unit
33: Communication unit
34: Display unit

51: Movement control unit
52: Plan modification unit
53: Display control unit
54: Display unit
30: Drone system
110, 110A, 110B: Drone
120: Ground-based device
113: Plan modification unit
114: Automatic flight control unit
122: Modified plan visualization unit
131: Modified plan reconstruction unit
211: Automatic plan modification unit
221: Pre-plan retention unit
231: Distance measurement unit
232: Approach prevention plan change unit

The invention claimed is:

1. An information processing method comprising:

modifying a movement plan in reference to modification information input during automatic movement of a drone to obtain a modified plan;

controlling the automatic flight of the drone based on the modified plan;

transmitting, from the drone to a ground-based device retaining a copy of the movement plan, a modification representing a difference between the movement plan and the modified plan; and displaying the modified plan on the ground-based device during the automatic movement of the drone, the modified plan being reconstructed based on the retained copy of the movement plan and the modification.

2. The information processing method according to claim 1, wherein a movement route of the mobile body included in the movement plan is modified in reference to the modification information, and the movement route modified is displayed as the modified plan.

3. The information processing method according to claim 2, wherein position information representing the movement route is modified as a whole in reference to the modification information, and the movement route represented by the position information modified as a whole is displayed as the modified plan.

4. The information processing method according to claim 2, wherein position information representing the movement route is sequentially modified in reference to the modification information, and the movement route represented by the position information sequentially modified is sequentially displayed as the modified plan.

5. The information processing method according to claim 2, wherein the movement route before modification is displayed together with the movement route modified.

6. The information processing method according to claim 5, wherein the movement route before modification includes at least one of a first movement route set before movement of the mobile body and a second movement route set during automatic movement standby of the mobile body, and at least one of the first movement route and the second movement route is displayed together with the movement route modified.

7. The information processing method according to claim 6, wherein the second movement route is the first movement route modified in reference to the modification information input during the automatic movement standby of the mobile body.

8. The information processing method device according to claim 1, wherein a movement route of the mobile body included in the movement plan is modified in reference to the modification information, and a numerical value representing a modification amount of the movement route modified is displayed as the modified plan.

9. The information processing method according to claim 1, wherein the modification information includes operation information representing a modification operation for the movement plan by a user, and the modified plan modified in reference to the operation information is output.

10. The information processing method according to claim 9, wherein, in a case where the operation information has been input, the modified plan modified in reference to the operation information is output, and, in a case where the operation information has not been input, the movement plan is output without modification.

11. The information processing method according to claim 9, wherein the operation information is input from a ground-based device capable of communicating with the mobile body.

12. The information processing method according to claim 1, wherein the modification information includes surrounding information representing a situation around the mobile body.

13. The information processing method according to claim 12, wherein the surrounding information includes distance information representing a certain distance to be maintained between the mobile body and an approach avoidance target, and the modified plan modified in reference to the distance information is output.

14. The information processing method according to claim 13, wherein the distance information is input in a case where the mobile body and the approach avoidance target approach each other within a threshold distance determined in advance.

15. The information processing method according to claim 14, wherein whether the mobile body and the approach avoidance target have approached each other within the threshold distance or not is determined in reference to sensor information acquired by a distance measurement sensor mounted on the mobile body.

16. The information processing method according to claim 13, wherein the modification information further includes operation information representing a modification operation for the movement plan by a user, and the modified plan modified in reference to the operation information is further modified in reference to the distance information.

17. The information processing method according to claim 1, wherein the mobile body includes a drone capable of automatic flight based on a flight plan.

18. An information processing device comprising:
circuitry configured to
modify a movement plan in reference to modification information input during automatic movement of a drone to obtain a modified plan,
control the automatic flight of the drone based on the modified plan, and
transmit, to a ground-based device retaining a copy of the movement plan, a modification representing a difference between the movement plan and the modified plan.

19. A mobile body control system comprising:
a drone;
circuitry of the drone configured to
modify a movement plan, in reference to modification information input during automatic movement of the drone,
obtain a modified plan, control the automatic flight of the drone based on the modified plan, and
transmit, to a ground-based device retaining a copy of the movement plan, a modification representing a difference between the movement plan and the modified plan;
a ground-based device; and
circuitry of the ground-based device is configured to
display the modified plan during the automatic movement of the drone, the modified plan being reconstructed based on the retained copy of the movement plan and the modification.

* * * * *